(12) United States Patent
Cobler

(10) Patent No.: US 11,597,592 B2
(45) Date of Patent: *Mar. 7, 2023

(54) POLYMERIC BAGS AND METHOD OF FORMING POLYMERIC BAGS

(71) Applicant: Poly-America, L.P., Grand Prairie, TX (US)

(72) Inventor: Brad A. Cobler, Irving, TX (US)

(73) Assignee: Poly-America, L.P., Grand Prairie, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/489,354

(22) Filed: Sep. 29, 2021

(65) Prior Publication Data

US 2022/0017299 A1 Jan. 20, 2022

Related U.S. Application Data

(63) Continuation of application No. 16/369,832, filed on Mar. 29, 2019, now Pat. No. 11,161,687, which is a continuation of application No. 15/397,821, filed on Jan. 4, 2017, now Pat. No. 10,336,535, which is a continuation-in-part of application No. 15/139,480, filed on Apr. 27, 2016, now Pat. No. 10,138,054, which is a continuation-in-part of application No. 14/659,785, filed on Mar. 17, 2015, now Pat. No. 9,487,334, said application No. 15/397,821 is a continuation-in-part of application No. 14/645,533, filed on Mar. 12, 2015, now Pat. No. 9,573,729.

(51) Int. Cl.
*B65F 1/00* (2006.01)
*B29C 59/04* (2006.01)
*B29L 31/00* (2006.01)
*B29K 23/00* (2006.01)

(52) U.S. Cl.
CPC ............ *B65F 1/0006* (2013.01); *B29C 59/04* (2013.01); *B65F 1/002* (2013.01); *B29K 2023/0625* (2013.01); *B29K 2023/0633* (2013.01); *B29L 2031/7128* (2013.01)

(58) Field of Classification Search
CPC ........ B65F 1/002; B65F 1/0006; B29C 59/04; B29K 2023/0625; B29K 2023/0633; B29L 2031/7128
See application file for complete search history.

(56) References Cited

U.S. PATENT DOCUMENTS

| | | | | |
|---|---|---|---|---|
| 10,138,054 B2 * | 11/2018 | Cobler | ............... | B65F 1/002 |
| 10,336,535 B2 * | 7/2019 | Cobler | ............... | B65F 1/002 |
| 10,611,563 B2 * | 4/2020 | Cobler | ............... | B65F 1/002 |
| 11,161,687 B2 * | 11/2021 | Cobler | ............... | B65F 1/0006 |

* cited by examiner

*Primary Examiner* — Monica A Huson
(74) *Attorney, Agent, or Firm* — Daniel J. Layden

(57) ABSTRACT

The present invention relates to improvements for the manufacturing of a wave-cut bag of polymeric film, more specifically a wave-cut bag with a body having improved shock, tear and puncture resistance. The polymeric film has an embossed pattern of a plurality of embossed regions that are comprised of a plurality of parallel, linear embosses. Further disclosed is a process for intermittently applying the embossed pattern to a collapsed tube of a blown film extrusion process. The collapsed tube with the intermittently applied embossed pattern is particularly well suited for constructing wave-cut trash bags with the embossed pattern applied to a central body of the wave-cut bags.

20 Claims, 22 Drawing Sheets

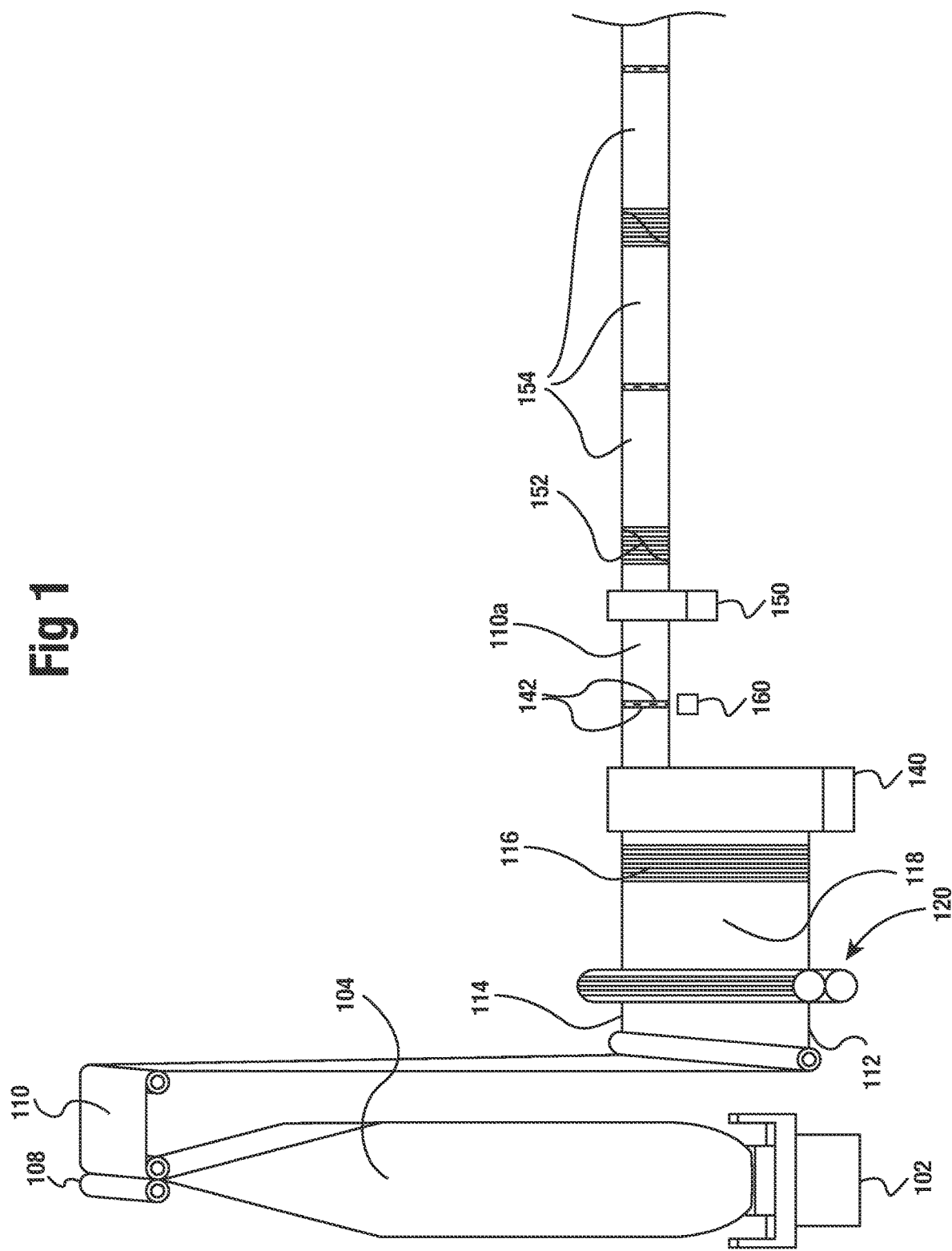

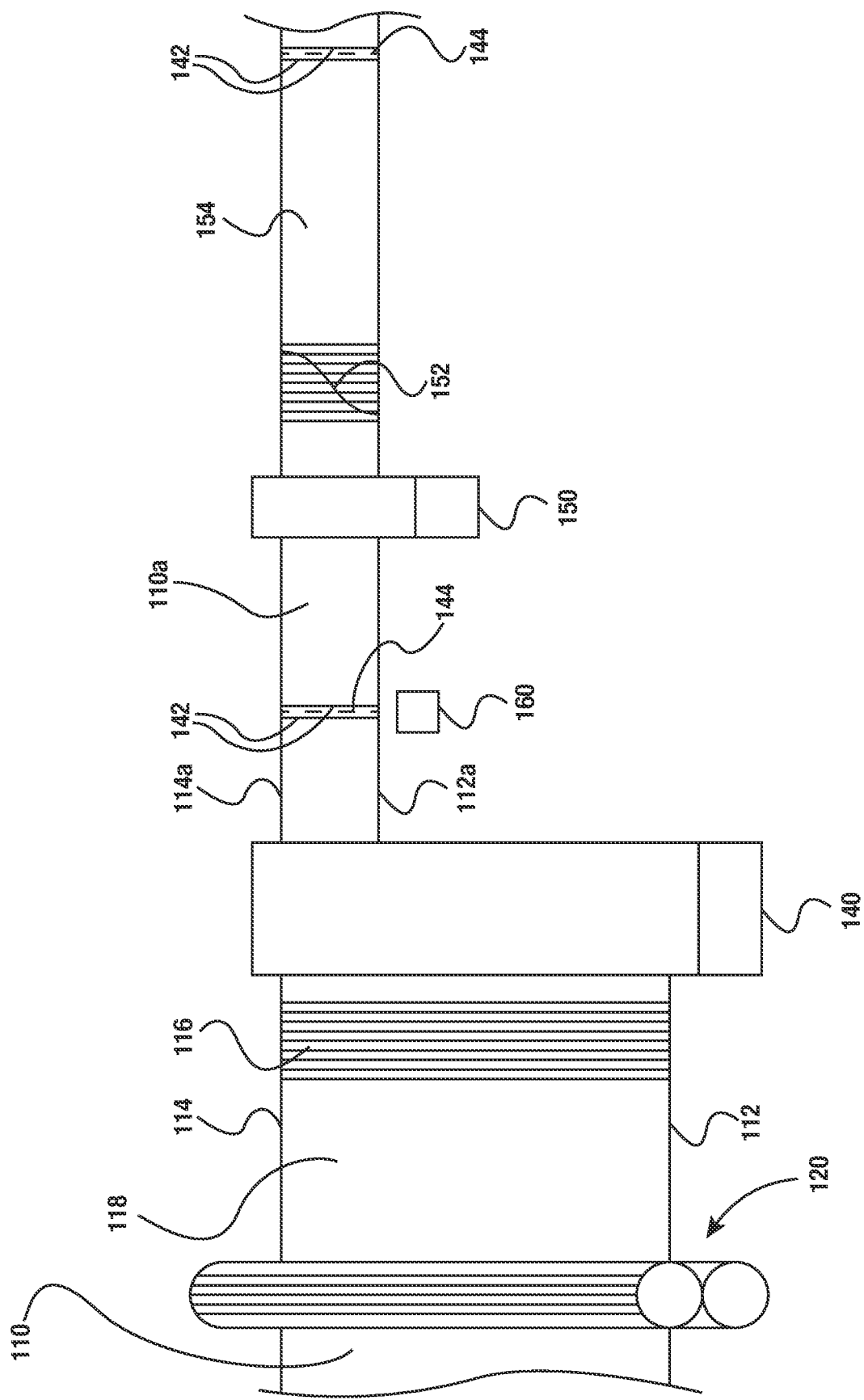

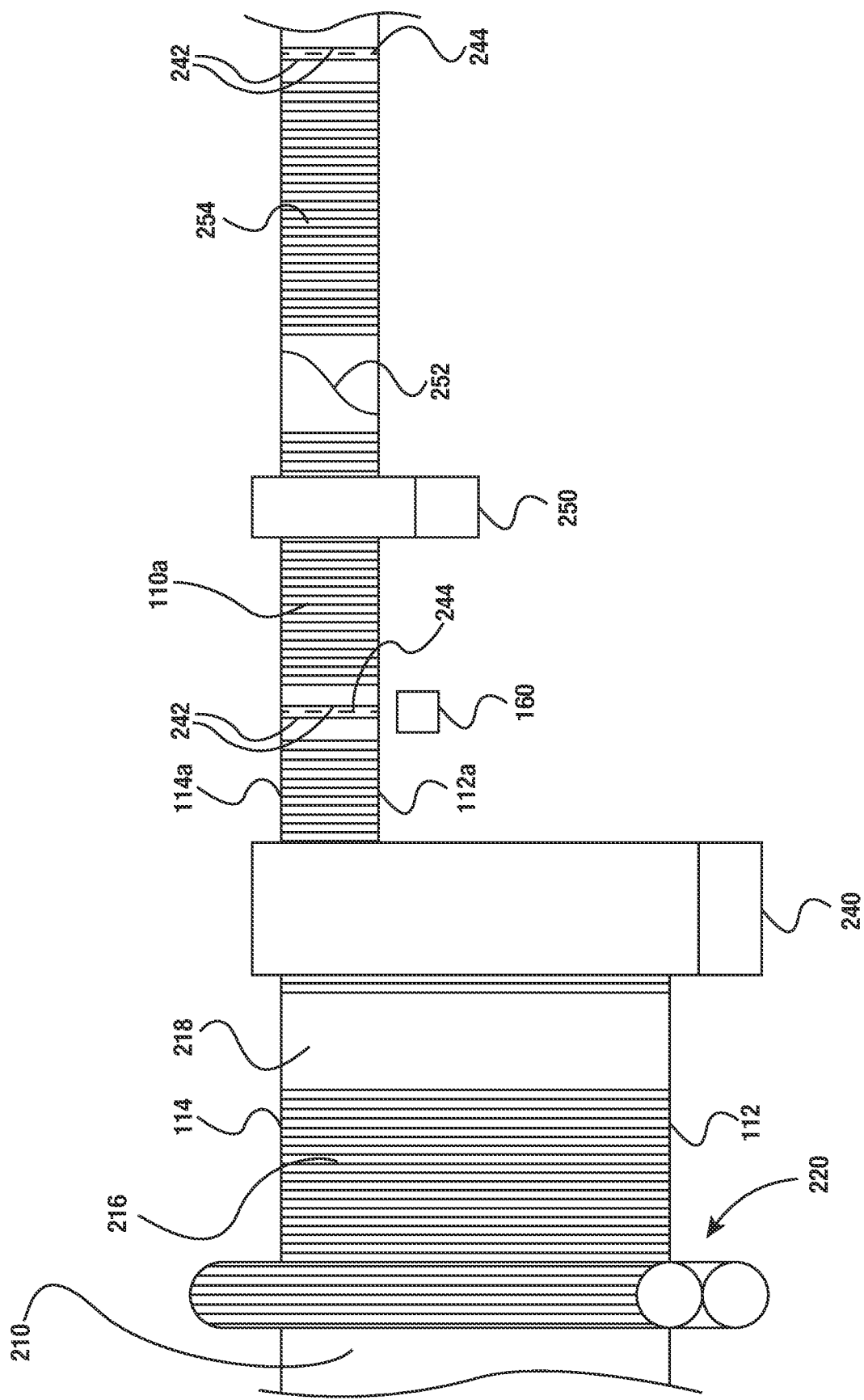

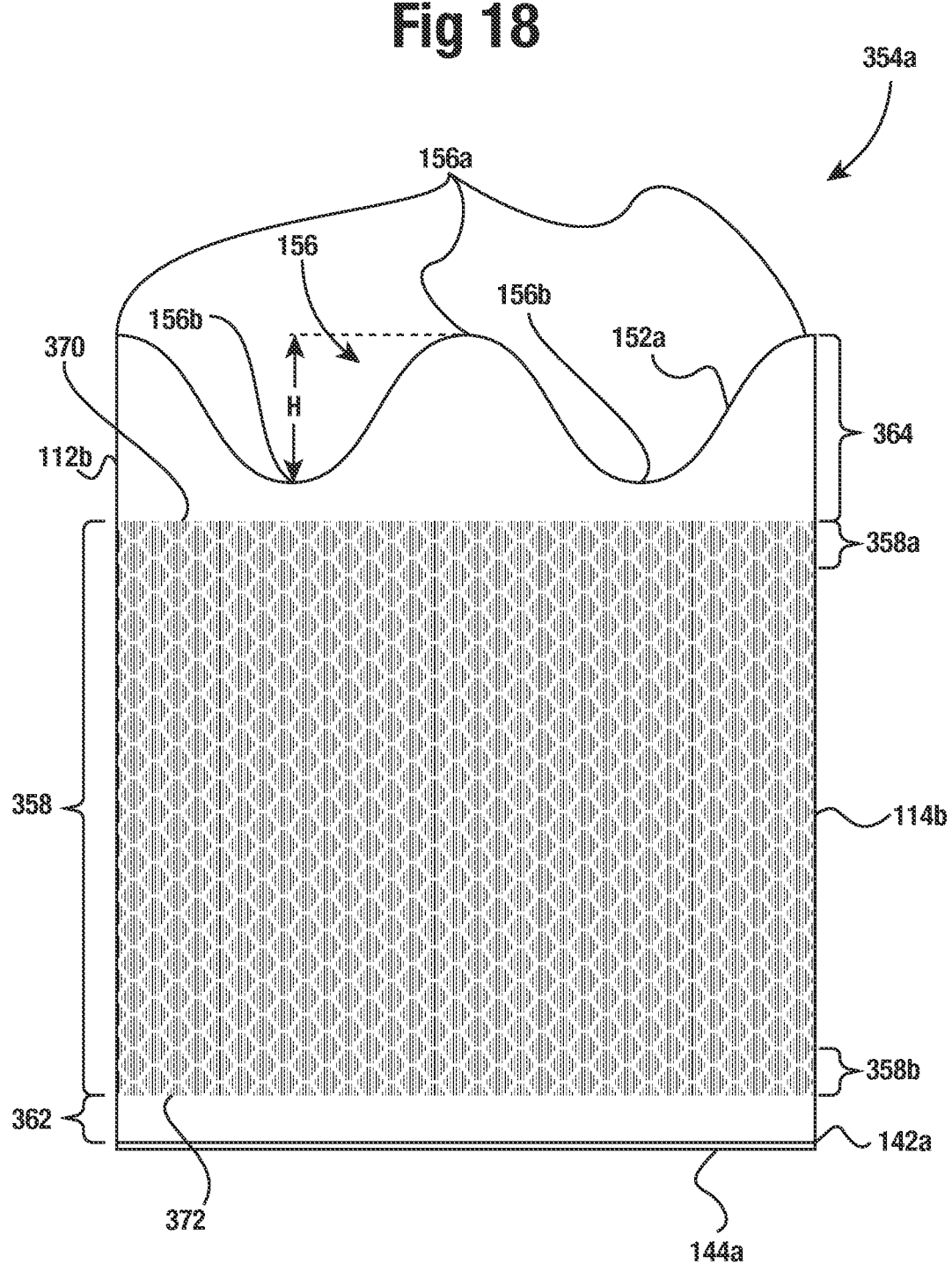

POLYMERIC BAGS AND METHOD OF FORMING POLYMERIC BAGS

CROSS-REFERENCE TO RELATED APPLICATIONS

This application is a continuation of U.S. application. Ser. No. 16/369,832, filed Mar. 29, 2019, which is a continuation of U.S. application. Ser. No. 15/397,821, filed Jan. 4, 2017, now U.S. Pat. No. 10,336,535, which is a continuation-in-part of U.S. application. Ser. No. 15/139,480, filed Apr. 27, 2016, now U.S. Pat. No. 10,138,054, which is a continuation-in-part of U.S. application Ser. No. 14/659,785, filed Mar. 17, 2015, now U.S. Pat. No. 9,487,334. U.S. application. Ser. No. 15/397,821, filed Jan. 4, 2017, is also a continuation-in-part of U.S. application. Ser. No. 14/645,533, filed Mar. 12, 2015, now U.S. Pat. No. 9,573,729. All of these aforementioned applications are hereby incorporated by reference into this disclosure.

BACKGROUND OF THE INVENTION

1. Field of the Invention

The present invention relates to improvements in bags made from polymeric film and processes for manufacturing polymeric film bags.

2. Description of the Related Art

Polymeric films are used in a variety of applications. For example, polymeric films are used in sheet form for applications such as drop cloths, vapor barriers, and protective covers. Polymeric films can also be converted into plastic bags, which may be used in a myriad of applications. The present invention is particularly useful to trash bags constructed from polymeric film.

Polymeric bags are ubiquitous in modern society and are available in countless combinations of varying capacities, thicknesses, dimensions, and colors. The bags are available for numerous applications including typical consumer applications such as long-term storage, food storage, and trash collection. Like many other consumer products, increased demand and new technology have driven innovations in polymeric bags improving the utility and performance of such bags. The present invention is an innovation of particular relevance to polymeric bags used for trash collection and more particular for larger bags used for the collection of larger debris, such as yard debris.

Polymeric bags are manufactured from polymeric film produced using one of several manufacturing techniques well-known in the art. The two most common methods for manufacture of polymeric films are blown-film extrusion and cast-film extrusion. In blown-film extrusion, the resulting film is tubular while cast-film extrusion produces a generally planar film. The present invention is generally applicable to drawstring trash bags manufactured from a blown-film extrusion process resulting in tubular film stock. Manufacturing methods for the production of bags from a collapsed tube of material are shown in numerous prior art references including, but not limited to, U.S. Pat. Nos. 3,196,757 and 4,624,654, which are hereby incorporated by reference.

In blown film extrusion, polymeric resin is fed into an extruder where an extrusion screw pushes the resin through the extruder. The extrusion screw compresses the resin, heating the resin into a molten state under high pressure. The molten, pressurized resin is fed through a blown film extrusion die having an annular opening. As the molten material is pushed into and through the extrusion die, a polymeric film tube emerges from the outlet of the extrusion die.

The polymeric film tube is blown or expanded to a larger diameter by providing a volume of air within the interior of the polymeric film tube. The combination of the volume of air and the polymeric film tube is commonly referred to as a bubble between the extrusion die and a set of nip rollers. As the polymeric film tube cools travelling upward toward the nip rollers, the polymeric film tube solidifies from a molten state to a solid state after it expands to its final diameter and thickness. Once the polymeric film tube is completely solidified, it passes through the set of nip rollers and is collapsed into a collapsed polymeric tube, also referred to as a collapsed bubble.

One common method of manufacturing trash bags involves segregating the collapsed polymeric tube into individual trash bags by forming seals which extend transversely across the entire width of the tube. Typically, a line of perforations is formed immediately adjacent and parallel to each seal to facilitate separation of the trash bags one from another. After the trash bags are sealed and perforated, the trash bags can be twice-folded axially into a fractional width configuration.

It is also known to provide wave-cut trash bags. A wave-cut trash bag has a wave or lobe-shaped configuration at its open end. This provides two or more lobes, which can be used to tie the trash bag in a closed configuration after it is filled with refuse.

Wave-cut trash bags can be manufactured by providing closely spaced, parallel transversely extending seals at predetermined intervals along the collapsed polymeric tube. A transversely extending line of perforations is provided between the closely spaced, parallel seals. The collapsed polymeric tube is then separated longitudinally along a wave or lobe-shaped line located equidistant between the edges of the tube.

The lobe-shaped features, or lobes, of a wave-cut trash bags, which may also be referred to as tie-flaps, provide a convenient user feature to tie and close the opening of the bag. The lobes are grasped and knotted to seal the bag opening. Representatives of wave-cut or "tie bags" can be found in the following prior art of U.S. Pat. Nos. 4,890,736, 5,041,317, 5,246,110, 5,683,340, 5,611,627, 5,709,641, and 6,565,794, which are hereby incorporated by reference into this disclosure.

In a further publication, U.S. Pat. Appl. Pub. 2008/0292222A1 discloses a bag having at least two "tie flaps" with gripping features embossed on at least one surface of the tie flaps. It is further disclosed that the bag may be formed from a tube of polymeric material. However, the publication further discloses that the gripping feature is formed in a linear fashion along a length of a blown film bubble that is then slit lengthwise in a wave pattern. The bubble is then formed into bags after being collapsed with a collapsed edge forming a bottom of the bag.

It has been determined, however, that the lobes of prior art wave-cut bags are often difficult to grasp and manipulate, especially if the lobes are contaminated with slippery trash contamination such as oil or grease or moist organic contaminants. Furthermore, wave-cut bags are often manufactured with thicker film than other types of trash bags since they often are intended for use with larger and heavier debris, such as yard debris and debris from home improvement projects. These thicker films used on larger wave-cut bags can be as thick as 3 mils and make it challenging for a user to manipulate the lobes of a wave-cut bag into a knot. Hence, it would be desirable to provide a wave-cut bag that has easier to grasp lobes that are also thinner than the rest of the bag. The present invention represents a novel solution to address this need.

It has also been determined that for certain thicknesses of wave-cut trash bags it may be desirable to provide a bag with thicker lobes relative to thinner a central body of the bag. Thicker lobes may provide a perception of strength to a user when handling the bag and provide a bag that forms a more robust closure. The thinner body of the bag allows a manufacturer to provide thicker lobes that are desired by consumers while also using less raw material than would otherwise be required to form a bag with a uniform thickness having the same thickness the area of the bag's lobes.

Additional problems are understood to be inherent with the use of polymeric films in trash bags. For instance, the use of polymeric film presents technical challenges since polymeric film is inherently soft and flexible. Specifically, all polymeric films are susceptible to puncture and tear propagation. In some instances, it may be possible to increase the thickness of the film or select better polymers to enhance the physical properties of the film. However, these measures increase both the weight and cost of the polymeric film and may not be practicable. In light of the technical challenges of polymeric film, techniques and solutions have been developed to address the need for improved shock absorption to reduce the likelihood of puncture. For example, it is known to impart stretched areas into polymeric films as a means of inducing shock absorption properties into the film.

U.S. Pat. No. 5,205,650, issued to Rasmussen and entitled Tubular Bag with Shock Absorber Band Tube for Making Such Bag, and Method for its Production, discloses using polymeric film material with stretchable zones wherein the film material has been stretched in a particular direction with adjacent un-stretched zones that extend in substantially the same direction. The combination of the stretched zones and adjacent un-stretched zones provides a shock absorber band intended to absorb energy when the bag is dropped. Specifically, when a bag is dropped or moved, the contents inside the bag exert additional forces that would otherwise puncture or penetrate the polymeric film. However, the shock absorber bands absorb some of the energy and may prevent puncture of the film.

Another example of a polymeric film material designed to resist puncture is disclosed in U.S. Pat. No. 5,518,801, issued to Chappell and entitled Web Materials Exhibiting Elastic-Like Behavior. Chappell, in the aforementioned patent and other related patents, discloses using a plurality of ribs to provide stretchable areas in the film much like Rasmussen. Chappell also discloses methods of manufacturing such polymeric film with such ribs.

Another example of shock absorption to prevent puncture is disclosed in U.S. Pat. No. 5,650,214 issued to Anderson and entitled Web Materials Exhibiting Elastic-Like Behavior and Soft Cloth-Like Texture. Anderson discloses using a plurality of embossed ribs defining diamond-shaped areas with a network of unembossed material between the diamond-shaped areas. Thus, the unembossed area comprises a network of straight, linear unembossed material extending in two perpendicular directions.

The foregoing disclosures specifically address the desire to increase the shock absorption of polymeric film to reduce the likelihood of punctures occurring in the film. However, none of the foregoing disclosures address the problem of reducing tear propagation in the polymeric film of a bag.

Previously known solutions to limiting tear propagation are based on two primary concepts. First, longer and more tortuous tear paths consume more energy as the tear propagates and can help in limiting the impact of the tear in a bag or polymeric film. Second, many polymeric films, particularly polymeric films made using a blown-film extrusion process, have different physical properties along different axes of the film. In particular, blown films are known to have higher tear strength in the cross-direction versus the corresponding tear strength in the machine direction. Certain prior art solutions take advantage of the differential properties of polymeric films by redirecting tears into a different direction. This redirecting of tears can offer greater resistance to a tear propagating. For example, some solutions redirect a tear propagating in the weaker machine direction of blown film into the stronger cross-direction.

One solution for reducing tear propagation is based on the idea that longer, tortuous tear paths are preferable and is described in U.S. Pat. No. 6,824,856, issued to Jones and entitled Protective Packaging Sheet. Jones discloses materials suitable for packaging heavy loads by providing an embossed packaging sheet with improved mechanical properties. Specifically, a protective packaging sheet is disclosed where surfaces of the sheet material are provided with protuberances disposed therein with gaps between protuberances. The protuberances are arranged such that straight lines necessarily intersect one or more of the protuberances. The resulting protective packaging sheet provides mechanical properties where tears propagating across the polymeric sheet are subject to a tortuous path. The tortuous path is longer, and more complex, than a straight-line tear, and a tear propagating along such a path would require markedly more energy for continued propagation across the film compared to a tear along a similar non-tortuous path in the same direction. Thus, due to the increased energy required for tear propagation, the tortuous path ultimately reduces the impact of any tears that do propagate across the film.

Another example of a tear resistant plastic film is disclosed in U.S. Pat. No. 8,357,440, issued to Hall and entitled Apparatus and Method for Enhanced Tear Resistance Plastic Sheets. Hall discloses an alternative tortuous path solution and further relies on the fact discussed above that certain polymer films, particularly polymeric films made in a blown-film extrusion process, are known to have a stronger resistance to tear in the cross direction when compared to the machine direction.

Hall discloses a solution that contemplates using preferably shaped embosses, particularly convex shaped embosses with a curved outer boundary, to provide maximum resistance to tear propagation. In most polymeric films, a tear will have a tendency to propagate along the path of least resistance or in the machine direction. Hall contemplates redirecting propagating tears in a tortuous path with the additional intent of redirecting the machine direction tears along the curved edges of the embossed regions and into a cross direction orientation. The redirected tears in the cross direction will be subject to additional resistance and, preferably, will propagate to a lesser degree than a tear propagating in the machine direction in an unembossed film.

U.S. Pat. No. 9,290,303 to Brad A. Cobler (the Cobler patent) with a filing date of Oct. 24, 2013, herein incorporated by reference into this disclosure, discloses use of an embossing pattern on polymeric film that balances both properties of shock absorption and tortuous tear paths in the cross direction, into a single, practicable polymeric film. The patent discloses that the embossing pattern comprises a plurality of embossed regions comprised of a plurality of parallel, linear embosses. The plurality of embossed regions is arranged so that a straight line cannot traverse the polymeric film without intersection at least one of the plurality of embossed regions.

It would be desirable to provide the polymeric film of the body of wave-cut trash bags, or the body of trash bags in general, with the embossing pattern of the Cobler patent. A bag with this pattern would provide a trash bag with improved shock absorption and resistance to tear propagation in comparison to the state of the art wave-cut trash bags. It would also be desirable to provide a wave-cut bag with the Cobler embossing pattern only in the body of the bag and not in the bottom area of the bag or in the lobes of the wave-cut opening. The emboss pattern defined only in the body of the bag would provide the above-discussed advantages without the embossing pattern interfering with the tying of the bag with the lobes or interfering with the bottom seal of the bag. The present invention addresses these additional objectives.

SUMMARY OF THE PRESENT INVENTION

In at least one embodiment of the present invention, a bag of polymeric film may be formed. To form the polymeric bag, a collapsed tube of polymeric film may be formed with a machine direction. The collapsed tube may be formed from a blown film extrusion process. Once the collapsed tube is formed, a pair of intermeshing rollers may intermittently engage the collapsed tube to form a plurality of embossed sections and unembossed sections in the collapsed tube. Each of the embossed sections may comprise a plurality of embossed regions and each of the embossed regions may be separated from adjacent embossed regions by an unembossed arrangement.

Once the collapsed tube is embossed, a bag converting operation may form the collapsed tube into a plurality of bags. Each one of the plurality of bags may have at least a fraction of one of the plurality of embossed sections. Each of the embossed sections may extend across the entire width of the collapsed tube. The bag converting operation may further comprise forming sets of closely spaced, parallel seals extending transversely across the entire width of the collapsed tube. Each set of closely spaced parallel seals may be at equally spaced intervals from each other. The bag converting operation may also form perforation lines extending transversely across the entire width of the collapsed tube with a perforation line located between each set of closely spaced, parallel seals. A plurality of wave-shaped perforations may also be formed in the collapsed tube. A location of each wave-shaped perforation may be equidistant from adjacent perforation lines. Each wave-shaped perforation may be centered within one of the plurality of incrementally stretched sections.

The converting operation may further comprise a timing operation. The timing operation may detect the location of each perforation line and generate a timing signal. The location of each wave-shaped perforation and embossed section may be based upon the timing signal. The timing operation may be a standalone operation or may be integrated into the bag converting operation. The timing signal may trigger the intermeshing rollers to engage and disengage the collapsed tube twice to form two embossed sections for each timing signal generated.

The pair of intermeshing rollers of the embossing process may counter-rotate in relation to each other so that the collapsed tube is fed through the pair of intermeshing rollers. Each roller may have a rotational axis and the two axes of the rollers may be parallel with each other. The axes of each of the pair of intermeshing rollers may also be perpendicular to the machine direction of the collapsed tube. The pair of intermeshing rollers may comprise a first roller and a second roller. The first roller may include a plurality of grooves perpendicular to the axis of the first roller. The plurality of grooves on the first roller may intermesh with an embossing pattern on the second roller. Each intermeshing roller may rotate in a direction that the collapsed bubble is moving so that the bubble is drawn through the pair of intermeshing rollers. A pair of post-embossing rollers downstream from the pair of intermeshing rollers and a pair of pre-embossing rollers upstream of the intermeshing rollers may be provided to control the tension in the collapsed tube when it passes through the intermeshing rollers.

In at least certain embodiments, the embossing pattern may comprise a plurality of embossment regions defined in the second roller and each embossment region may comprise a plurality of embossment ridges. Each of the plurality of embossment ridges may be linear and parallel to each other. Each embossment region may be defined by a continuous embossment boundary. The embossment boundary may be generally flat and comprise at least a plurality of first segments and a plurality of second segments. The plurality of first segments may extend in a first direction and the plurality of second segments may extend in a second direction. The first and second directions may be distinct from each other. The embossment boundary may further comprise a plurality of third segments extending in a third direction with the third direction distinct from the first and second directions. The embossment boundary may also be devoid of embossment ridges.

In a further embodiment of the present invention, a bag is formed form a collapsed tube of polymeric film. The bag may comprise a first panel and a second panel. The first panel and the second panel may be joined along a first side edge, a second side edge, and a bottom edge by a bottom seal. The bottom seal may extend from the first side edge to the second side edge. The first side edge may be formed from a first edge of the collapsed tube and the second side edge may be formed from a second edge of the collapsed tube. The first panel may have a first top edge opposite the bottom edge and the second panel may have a second top edge opposite the bottom edge. The first top edge and second top edge may define an opening of the bag. A distal end of both the top edge and second top edge may have a wave-shaped profile and the wave-shaped profile may define a plurality of lobes. In at least one embodiment, an embossed section may be defined only below the plurality of lobes and the embossed section may comprise a plurality of embossed regions. Each of the embossed regions may be separated from adjacent embossed regions by an unembossed arrangement. The embossed section may extend from the first side edge to the second side edge.

In an additional embodiment of the present invention, a bag is formed form a collapsed tube of polymeric film. The bag may comprise a first panel and a second panel. The first panel and the second panel may be joined along a first side edge, a second side edge, and a bottom seal proximate to a bottom edge. The first side edge may be formed from a first edge of the collapsed tube and the second side edge may be formed from a second edge of the collapsed tube. The first panel may have a first top edge opposite the bottom edge and the second panel may have a second top edge opposite the bottom edge. The first top edge and second top edge may define an opening of the bag. A distal end of both the top edge and second top edge may have a wave-shaped profile comprising a plurality of crests and troughs.

The bag of the embodiment may further include an upper embossment boundary below the plurality of troughs of the wave-shaped profile. The upper embossment boundary may extend from the first side edge to the second side edge. A lower embossment boundary may be defined below the upper embossment boundary and above the bottom seal. The lower embossment boundary may extend from the first side edge to the second side edge. An embossed section may extend between the first side edge and the second side edge. The embossed section may also extend between the upper embossment boundary and the lower embossment boundary. The embossed section of the bag may comprise a plurality of embossed regions of embossments. Each embossed region may be separated from adjacent embossed regions by an unembossed arrangement. A first unembossed section may extend from the upper embossment boundary to the plurality of crests and from the first side edge to the second side edge. The first unembossed section may have a generally flat surface and be devoid of embossments. A second unembossed section may extend from the lower embossment boundary to the bottom edge and from the first side edge to the second side edge. The second unembossed section may have a generally flat surface and be devoid of embossments.

In at least certain embodiments, the continuous unembossed arrangement may comprise at least a plurality of first segments and a plurality of second segments. The plurality of first segments may extend in a first direction and the plurality of second segments may extend in a second direction. The first and second directions may be distinct from each other. The first and second embossment boundaries may be generally linear and parallel to the bottom seal. A machine direction of the collapsed tube may extend in a direction generally perpendicular to the bottom seal. The bottom seal may be generally perpendicular to the first side edge and the second side edge. Each of the embossed regions may comprise linear ribs and each linear rib may be generally perpendicular to the first side edge and the second side edge. A first transition zone may be between the embossed section and the first unembossed section. The first transition zone may comprise a plurality of linear embossments. The plurality of linear embossments may have tapering heights with a height of the linear embossments decreasing as the linear embossments extend towards the first unembossed section. The embossed section may further be formed from a pair of intermeshing rollers.

BRIEF DESCRIPTION OF THE RELATED DRAWINGS

A full and complete understanding of the present invention may be obtained by reference to the detailed description of the present invention and certain embodiments when viewed with reference to the accompanying drawings. The drawings can be briefly described as follows.

FIG. 1 depicts a perspective view of a first embodiment of the present invention.

FIG. 2a depicts a partial perspective view of the first embodiment of the present invention.

FIG. 2b depicts a partial perspective view of an alternate second embodiment of the present invention.

FIG. 18 depicts a front view of a tenth embodiment of the present invention.

DETAILED DESCRIPTION OF THE INVENTION

Figure 3A:
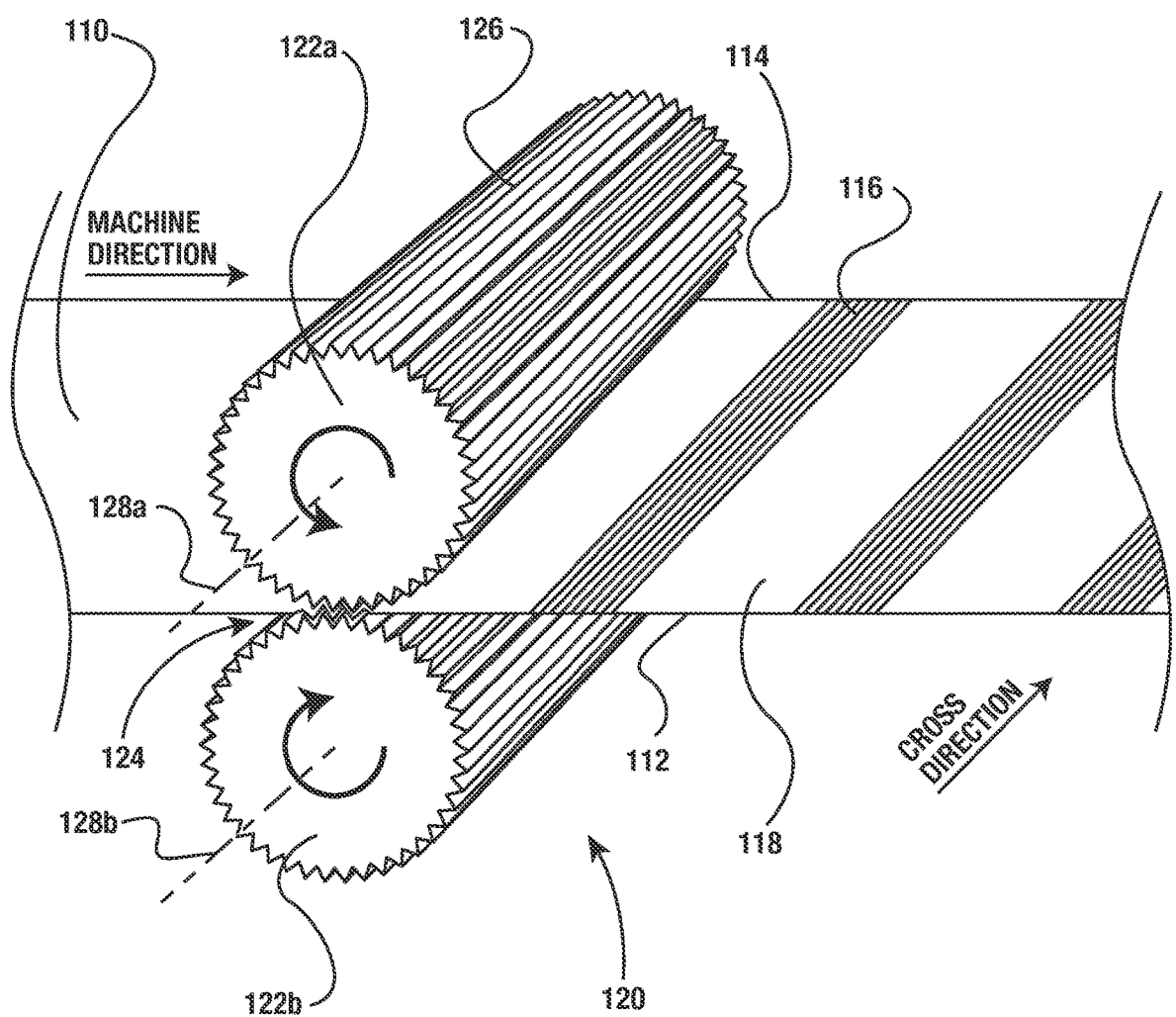
FIG. 3a depicts a perspective view of an incremental stretching operation of the first and second embodiments.

The present disclosure illustrates several embodiments of the present invention. It is not intended to provide an illustration or encompass all embodiments contemplated by the present invention. In view of the disclosure of the present invention contained herein, a person having ordinary skill in the art will recognize that innumerable modifications and insubstantial changes may be incorporated or otherwise included within the present invention without diverging from the spirit of the invention. Therefore, it is understood that the present invention is not limited to those embodiments disclosed herein. The appended claims are intended to more fully and accurately encompass the invention to the fullest extent possible, but it is fully appreciated that certain limitations on the use of particular terms are not intended to conclusively limit the scope of protection.

Referring initially to FIGS. 1 and 2, a process for forming wave-cut trash bags with incrementally stretched tie flaps or lobes is shown. The trash bags may be formed by a blown film extrusion process. The blown film extrusion process begins by molten polymeric resin being extruded through an annular die of an extruder, or extrusion operation 102 to form a bubble or tube of molten polymeric film 104. The direction that the film is extruded out of the die is commonly referred to as the machine direction (MD). The direction of extrusion may also be referred to as the lengthwise direction of the bubble or polymeric film tube 104. Hence, the length of the polymeric tube 104 extends parallel with the machine direction. The direction transverse to the machine direction is commonly referred to as the cross direction (CD). The blown film extrusion process is well known in the art and is further explained in U.S. Pat. No. 7,753,666, which is hereby incorporated by reference.

The polymeric resin used in the blown film extrusion process may vary. However, for forming polymeric bags, a polyethylene resin is commonly used. In the current state of the art for polymeric bags, a blend of various polyethylene polymers may be used. A polymer blend can have linear low-density polyethylene (LLDPE) as the primary component, but other polymers may be utilized including, but not limited to, other polyethylene resins such as high-density polyethylene (HDPE) or low-density polyethylene (LDPE). Typically, the primary component of the polymer blend, such as linear low-density polyethylene (LLDPE), will comprise at least 75% of the polymer blend. The remaining portion of the polymer blend may include additives including, but not limited to, coloring additives, anti-blocking agents, and/or odor control additives. The film utilized to form polymeric bags may also comprise multiple layers of blown film resin. The resultant multi-layer film may be formed by coextrusion, a lamination process, or other methods of forming a multi-layer film known in the art. In each layer, one or more of the above-discussed polymers may be used.

As shown in FIG. 1, once the bubble 104, or polymeric tube, of molten film solidifies, the bubble 104 is collapsed by a pair of nip rollers 108, which results in a collapsed tube 110. The collapsed tube 110 includes two opposing interconnected surfaces of film extending continuously in a lengthwise direction. This continuously extending surface of film may be referred to as a web. The nip rollers 108 are commonly elevated above the extruder 106 a considerable distance, since the molten bubble 104 is air-cooled and requires a relatively large vertical distance to cool and solidify before the bubble 104 is collapsed.

As shown in FIG. 2*a*, once collapsed, the collapsed tube 110 has a first edge 112 and second edge 114 defined in the opposing edges of the collapsed tube 110 extending the length of the collapsed tube 110. The distance from the first edge 112 to the second edge 114 of the collapsed tube 110 can define a width of the collapsed bubble. Once the collapsed tube 110 returns from the cooling tower (not shown), the collapsed tube 110 can feed directly into an incremental stretching operation 120; hence the incremental stretching can be performed as an in-line process, synchronously, with the blown film extrusion. As shown in FIG. 1 and more clearly in FIG. 2*a*, the incremental stretching operation 120 can be configured to only intermittently stretch the collapsed tube 110, leading to incrementally stretched partial lengths of the collapsed tube 110.

As shown in FIGS. 3*a*-4*b*, the incremental stretching operation 120 can include a pair of intermeshing rollers 122*a*, 122*b*. The diameter and length of each intermeshing roller 122*a*, 122*b* are equal in a preferred embodiment but may vary. As best shown in FIG. 3*a*, the collapsed tube 110 can enter a nip 124 defined by the pair of intermeshing rollers 122*a*, 122*b*. The rotational axes 128*a*, 128*b* of each roller 122*a*, 122*b* can be parallel to each other and transverse to the machine direction (MD) of the collapsed tube 110. Each of the rollers 122*a*, 122*b* can have a plurality of protruding ridges 126 parallel to the axis of each roller 128*a*, 128*b* that extend around the entire circumference of each roller 122*a*, 122*b* at a constant spacing. The protruding ridges 126 of the rollers 122*a*, 122*b* can be configured to intermesh like gears. As the collapsed tube 110 enters the nip of the intermeshing rollers 122*a*, 122*b*, the film of the collapsed tube 110 is stretched based upon the depth and spacing of the grooves 126.

As best shown in FIG. 3*a*, the film of the collapsed tube 110 is stretched by each groove of the plurality of protruding ridges 126 in the machine direction, which results in a pattern of stretched and un-stretched lengths with each length extending along the width or cross-direction of the collapsed tube 110. Examined closely, this pattern of stretched and un-stretched lengths results in a pattern of parallel thick ribs (un-stretched lengths) and thin ribs (stretched lengths) extending in the cross-direction of the collapsed tube 110 for each incrementally stretched section 116.

The preferred actual size and spacing of each of the plurality of protruding ridges 126 in relation to each of the rollers 122*a*, 122*b* is substantially exaggerated for ease of illustration in the figures. In one preferred embodiment, the spacing of the grooves can be 20 grooves per inch about the circumference of each roller 122*a*, 122*b*, with each groove leading to a matching thin rib/thick rib extending along the width of the collapsed tube 110. The spacing of the ribs in the film after stretching is greater than the groove spacing of the intermeshing rollers 122*a*, 122*b*, since the stretching causes the ribs to spread away from each other. The pattern of thick and thin ribs is represented by a pattern of parallel and adjacent lines in the figures.

Figure 3B:
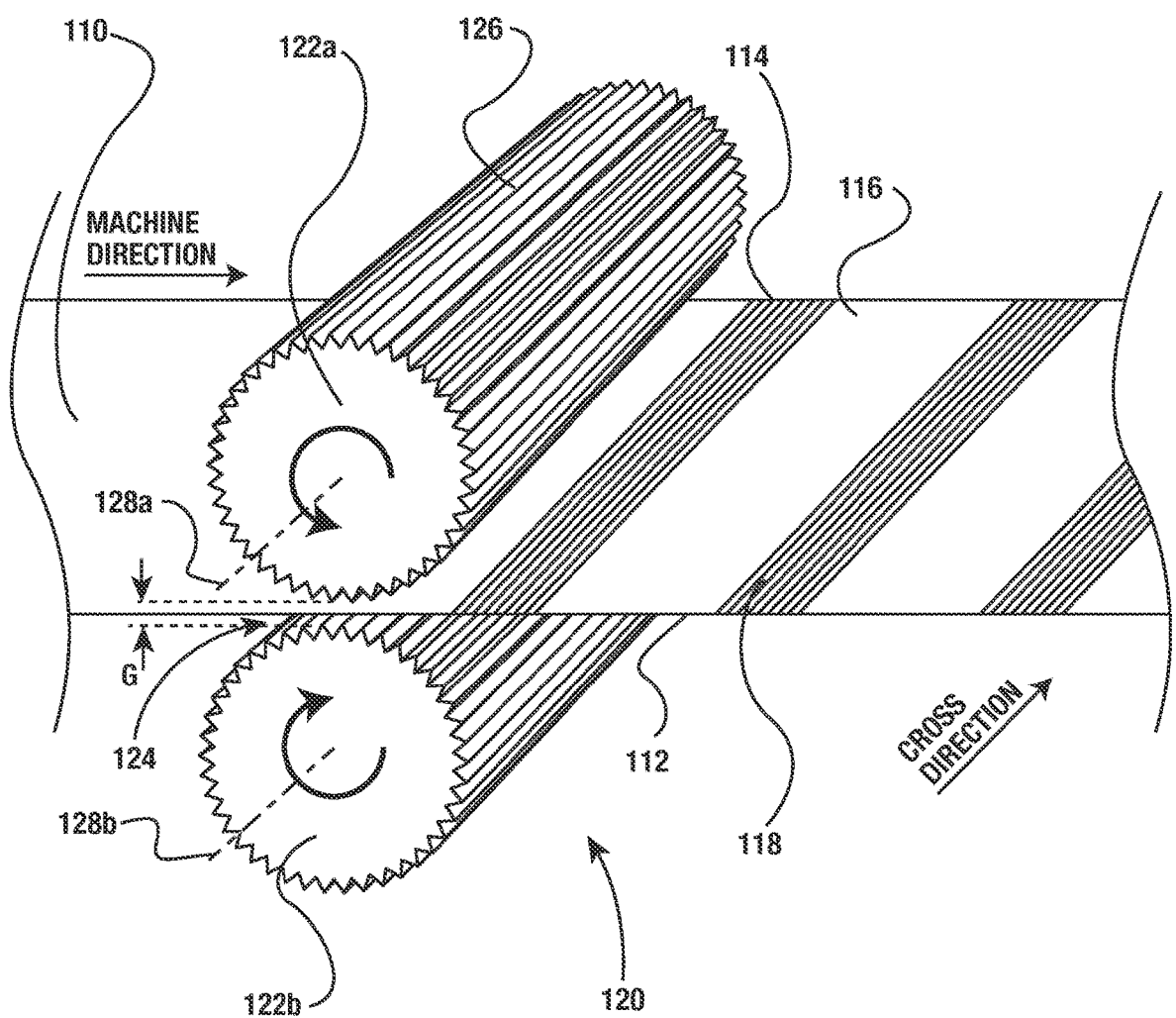
FIG. 3b depicts a secondary perspective view of the incremental stretching operation of the first and second embodiments.

Once again examining FIG. 3*a* and FIG. 3*b*, the incremental stretching operation 120 can be configured to only engage, and hence only incrementally stretch, the collapsed tube 110 intermittently. This intermittent engagement of the collapsed tube 110 leads to lengths of un-stretched sections 118 and lengths of incrementally stretched sections 116. As illustrated in FIG. 3*b*, the intermittent engagement of the collapsed tube 110 can be accomplished by the pair of intermeshing rollers 122*a*, 122*b* moving away from each other a certain distance G allowing the collapsed tube 110 to move past the incremental stretching operation 120 without being stretched by the intermeshing rollers 122*a*, 122*b*. The gap G, as shown in FIG. 3*b*, must be large enough to allow the collapsed tube 110 to pass through the nip 124 without interference from the intermeshing rollers 122*a*, 122*b*.

Figure 4A:
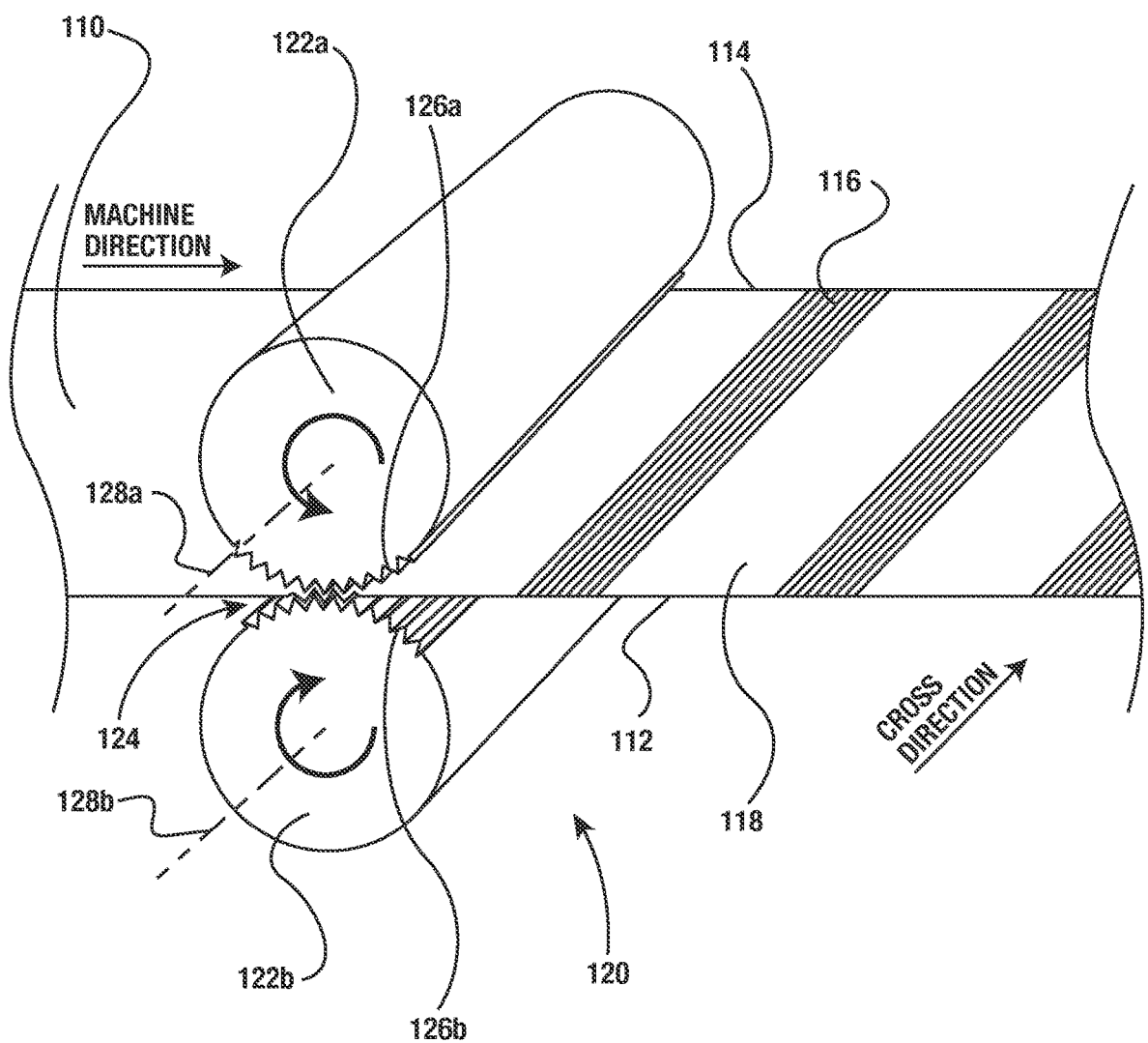
FIG. 4a depicts a perspective view of an incremental stretching operation of a third embodiment of the present invention.
Figure 4B:
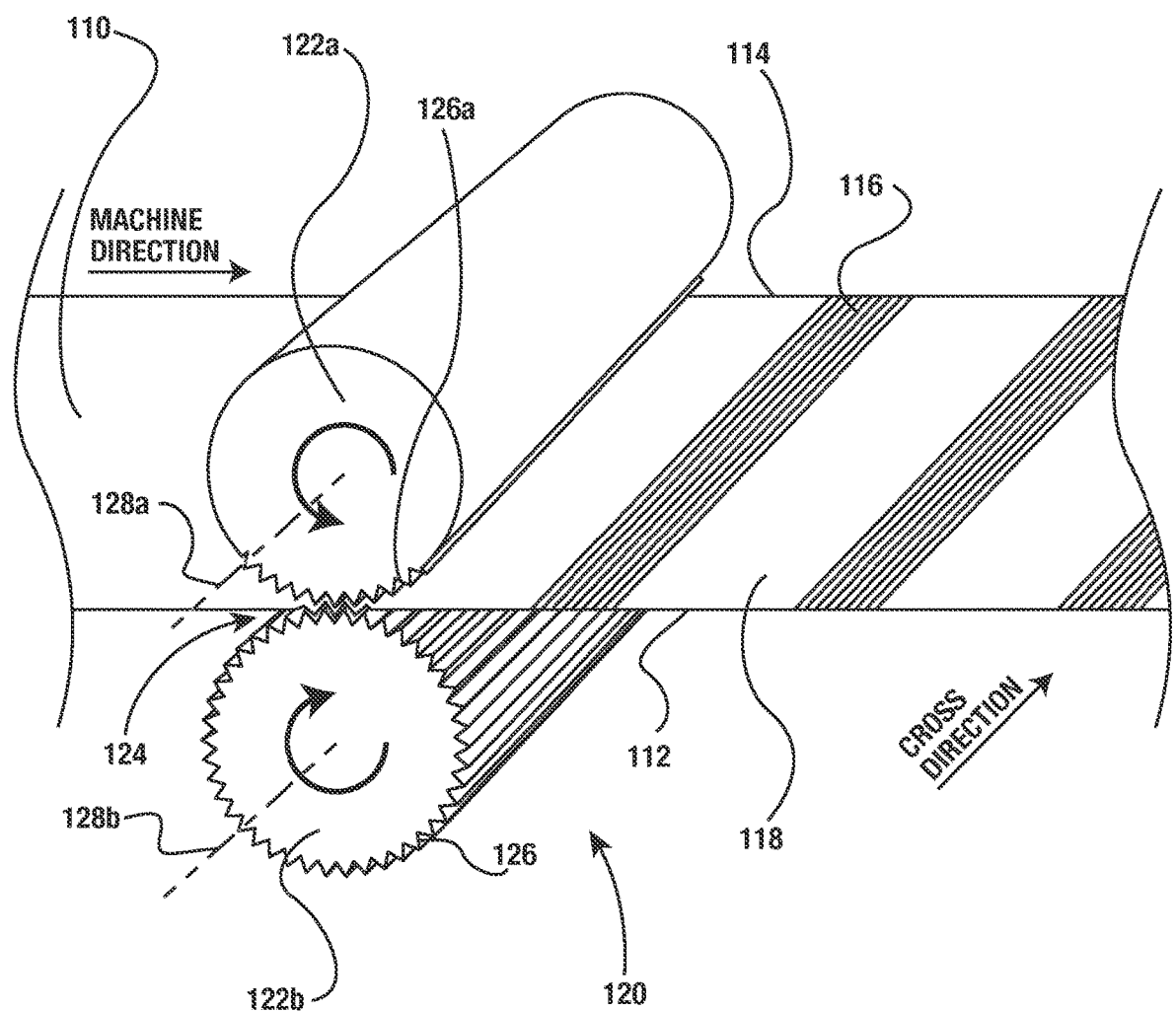
FIG. 4b depicts a perspective view of an incremental stretching operation of a fourth embodiment of the present invention.

Shown in FIG. 4*a* is an alternative method of intermittently incrementally stretching the collapsed tube 110. Unlike the previous embodiment of the incremental stretching operation 120 shown in FIGS. 3*a* and 3*b*, the rotational axes 128*c*, 128*d* of the pair of intermeshing rollers 122*a*, 122*b* are mounted stationary in relation to each other. However, the protruding ridges 126*a*, 126*b* extend only partially around the circumference of each roller 122*a*, 122*b* rather than about the entire circumference. The locations of the protruding ridges 126*a*, 126*b* on each roller 122*a*, 122*b* are spaced appropriately so that the protruding ridges 126*a*, 126*b* intermesh when the pair of rollers 122*a*, 122*b* revolve. Thus, the collapsed tube 110 is incrementally stretched only when the protruding ridges 126*a*, 126*b* intermesh and engage the collapsed tube 110. The geometry of each roller 122*a*, 122*b* can be configured so that the collapsed tube 110 is not in contact with either of the rollers 122*a*, 122*b* when not engaged with the protruding ridges 126*a*, 126*b*. In the alternative, the diameter of each roller 122*a*, 122*b*, can be configured such that the surface of one or more of the rollers 122*a*, 122*b* is in contact with the collapsed tube 110 while the protruding ridges 126*a*, 126*b* are not intermeshed. One or more of the rollers 122*a*, 122*b* in contact with the collapsed tube 110, when the protruding ridges 126*a*, 126*b* are not engaging the collapsed tube 110, may assist in maintaining the desired tension in the collapsed tube 110.

The rollers of FIG. 4a may rotate at a speed so that a tangential speed of each roller 122a, 122b matches a linear speed of the collapsed tube 110 passing through the nip 124. In the alternative, the tangential speed of the rollers 122a, 122b may only match the speed of the collapsed tube 110 when the collapsed tube 110 is engaged by the protruding ridges 126a, 126b. When the protruding ridges 126a, 126b are not engaged, the rotational speed, and hence the tangential speed, of the pair of rollers 122a, 122b can be decreased. In this instance, the diameter of each roller 122a, 122b must be configured such that the collapsed tube 110 is not in contact with the rollers 122a, 122b when not engaged with the protruding ridges 126a, 126b, since the linear speed of the collapsed tube 110 is typically constant. Decreasing the speed of the rollers 122a, 122b when not engaged with the web has the advantage of allowing smaller diameter rollers than would be required if the rollers rotated at a constant speed.

In one particular example, the incremental stretching operation 120 may be configured such that each incrementally stretched section 116 of the collapsed tube 110 is 15 inches in length after being stretched and each un-stretched section 118 is 85 inches in length. For rollers that rotate at a constant speed, the intermeshing rollers can be configured to stretch the collapsed tube approximately 15 percent such that the protruding ridges would extend about the circumference of each roller approximately 13 inches, stretching a length of 13 inches of the collapsed tube 110, which results in a length of 15 inches after being stretched. The remaining smooth circumference of 85 inches would then be devoid of the protruding ridges, which results in a total circumference of approximately 98 inches and a diameter of approximately 31.2 inches for each roller 122a, 122b.

Unlike rollers that rotate at a constant speed, rollers 122a, 122b configured to run at an oscillating speed could have a smaller circumference and hence a smaller overall size. For instance, when not engaged, the rollers 122a, 122b could rotate with an average tangential speed of 50 percent of the linear speed of the web. The speed of the rollers 122a, 122b would not step down instantly to 50 percent. Thus, the rollers 122a, 122b would first decelerate, then rotate at a speed of less than 50 percent, and then accelerate prior to engaging the collapsed tube 110 again. This arrangement would only require a smooth partial circumference of one-half the previous smooth circumference of approximately 42.5 inches and a 13-inch partial circumference having protruding ridges 126a, 126b for a total circumference of approximately 55.5 inches and a diameter of approximately 17.7 inches for each roller 122a, 122b. It also foreseeable that the rollers could rotate at an average tangential speed of much less than 50 percent when not engaged with the collapsed tube, such as 25 percent.

Decreasing the diameter and hence the overall size of the rollers 122a, 122b offers several advantages. First, the cost to produce the rollers is decreased with rollers of decreased size. In addition, with smaller rollers, the time to manufacture the rollers may also be reduced. Smaller rollers lead to lighter weight rollers, which can lead to a mounting system for the rollers to be proportionally smaller and less expensive to construct. Lighter rollers may also lead to smaller, less expensive motors for driving the rollers. The use of smaller drive motors may also lead to less energy consumption.

As shown in FIG. 4a, the axes 128a, 128b of the rollers 122a, 122b can be located relative to the collapsed tube 110 so that the collapsed tube 110 passes equidistant from both rollers 122a, 122b. However, in an alternative embodiment shown in FIG. 4b, the collapsed tube 110 can be located slightly further away from the bottom roller 122b so that protruding ridges 126 may extend completely about the entire circumference of the bottom roller 122b. In such an embodiment, the collapsed tube 110 passes over the lower protruding ridges 126 when not engaged by the upper protruding ridges 126a. When the collapsed tube 110 is engaged by the upper protruding ridges 126a, the collapsed tube 110 is pushed down into the lower protruding ridges 126 by the upper protruding ridges 126a.

In an alternative embodiment, the above-described incremental stretching operation 120 can be performed on a single layer web of polymeric film. For instance, the collapsed tube 110 may be slit along the first edge 112 so that the tube is open along the first edge 112. The collapsed tube may then be spread out so that the two opposing layers of the collapsed tube 110 lie in the same plane adjacent to each other. The single layer web may then be intermittently incrementally stretched as described above. Once the stretching is complete, the web may be folded so that the two layers of the collapsed tube 110 once again oppose each other. The two layers of film adjacent to the first edge 112 may then be sealed together so that the collapsed tube 100 may still be used to form wave-cut trash bags. Performing the incremental stretching on one layer of film may prevent undesired binding of the two layers of film.

In another alternative embodiment, rather than the incremental stretching operation 120 performed in-line and synchronously, as described above, with the blown film extrusion 102, the incremental stretching 120 can be performed off-line from the blown film extrusion. For instance, once the polymeric bubble 104 is collapsed by the nip rollers 108, the collapsed tube 110 can be rolled onto a master roll. The master roll can then be placed at a lead end of the incremental stretching operation 110 and the collapsed tube can be unrolled from the master roll. The collapsed tube 110 can then be fed into the incremental stretching operation 120.

Figure 5:
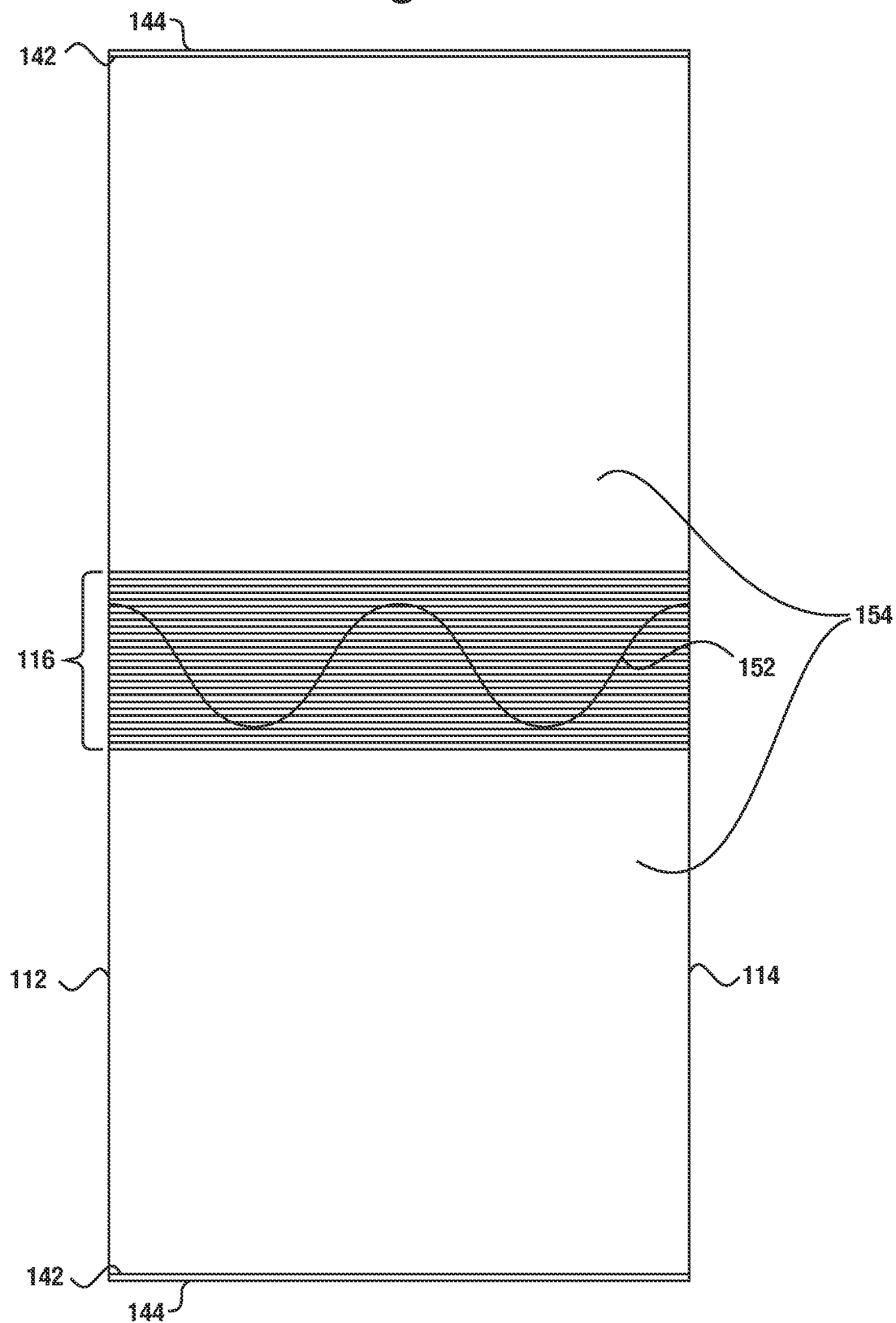
FIG. 5 depicts a front view of a fifth embodiment of the present invention.
Figure 6:
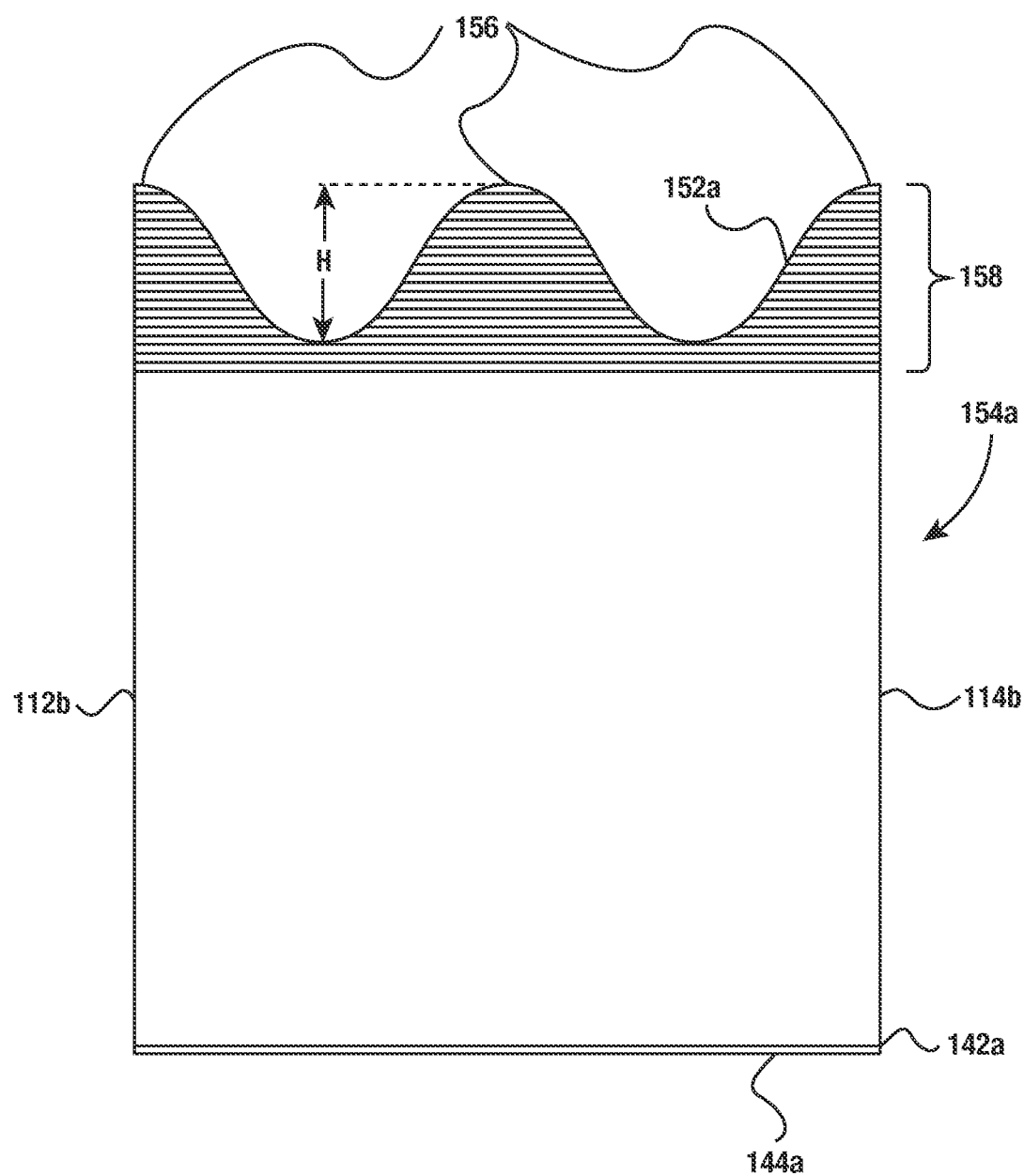
FIG. 6 depicts another front view of the fifth embodiment of the present invention.

Returning now to FIGS. 1 and 2, once the incremental stretching is complete, the collapsed tube 110 can enter a bag converter 140. The bag converter 140 can form sets of closely spaced, parallel seals 142. The sets of closely spaced parallel seals 142 can extend transversely to the machine direction and across the entire width of the collapsed tube 110. As shown in FIGS. 5 and 6, one seal of each set 142 can define a bottom seal 142a for each bag 154a. As shown in FIG. 2a, between each set of the closely spaced parallel seals 142, the bag converter 140 can form perforation lines 144. The perforation lines 144 can extend transversely to the machine direction, the cross direction, and across the entire width of the collapsed tube 110. Each perforation line 144 can define the bag bottom 144a (shown in FIG. 5) and separation point of adjoining bags 154.

Once again examining FIG. 2a, once the sets of closely spaced parallel seals 142 and perforation lines 144 are formed, the bag converter 140 can fold the collapsed tube 110 one or more times, with each fold extending along the length of the collapsed tube 110 and parallel to the machine direction. In at least one particular embodiment, the collapsed tube 110 can be folded twice such that a width of the folded collapsed tube 110a is one-fourth the width of the un-folded collapsed tube 110. Once folded, a first folded edge 112a and second folded edge 114a can be defined in opposing edges of each bag 154.

Once the collapsed tube 110 is folded, it can proceed into a wave-cutter 150. The wave-cutter 150, which may also be referred to as a wave-cutting operation, creates wave-cuts 152. Wave-cuts 152 are wave-shaped perforations, extending across the width of the folded collapsed tube 110*a*. The wave-cuts 152 can perforate the folded collapsed tube 110*a* in the shape of a one-half sine wave extending across the width of the folded collapsed tube 110*a*. In one particular embodiment, the peak-to-peak amplitude of the sine wave can be approximately 5 inches but may vary considerably. Due to the collapsed tube 110*a* being folded twice when each wave-cut 152 is made, when un-folded each wave-cut can have, in general, a shape of two full sine waves extending across the width of the collapsed tube 110.

The location of the wave-cut 152 in relation to the perforation line 144 can be controlled by a timing operation 160. The timing operation 160 can detect the location of each perforation line 144. The timing operation 160 can rely upon a laser beam, infrared light, a spark generator, or another form of an electromagnetic signal to detect each perforation line 144. The detected location of each perforation line 144, along with the fixed position of the timing operation 160 and the collapsed tube 110 traveling at a steady state, can be used to time the incremental stretching operation 120 and wave-cutting operation 150 so that each wave-cut 152 and incrementally stretched section 116 are placed at predetermined locations. The timing operation 160 may be a standalone operation or may be integrated into the bag converter 150.

In at least one preferred embodiment, each wave-cut 152 can be centered by the wave-cutter 150 about a height of an incrementally stretched section 116, in relation to the machine direction. Thus, a distance from a bottom of a wave-cut 152 to a lower boundary of an incrementally stretched section 116, the lower boundary separating an incrementally stretched section 116 from an un-stretched section 118, can be equal to a distance from a top of the wave-cut 152 to an upper boundary of the incrementally stretched section 116, the upper boundary opposite from the lower boundary. Each centered wave-cut 152 and incrementally stretched section 116 can be equidistant from adjacent perforation lines 144. In this preferred embodiment, once the collapsed tube 110 is separated at wave-cuts 152 and perforation lines 144 to form bags 154*a*, an approximate one-half length of an incrementally stretched section 116 is defined on each bag 154*a* (in relation to a mid-point or average of the waveform of the wave-cut 152).

In a particular example of this embodiment, the perforation lines 144 can be 100 inches away from each other. Each incrementally stretched section 116 and wave-cut 152 can also be separated from adjacent incrementally stretched sections 116 and wave-cuts 152 by 100 inches. Since the sections 116 and wave-cuts 152 are aligned or centered, a mid-point of each section 116 and wave-cut 152 is located 50 inches away from adjacent perforation lines 144.

Once the collapsed tube is folded and the wave-cuts 152 are placed, the folded collapsed tube 110*a* may be separated at the perforation lines 144 and wave-cuts 152 into individual bags 154 with each bag having a height of approximately 50 inches. Each bag 154 may then be overlapped with an adjoining bag and rolled into a roll of bags as is known in the art.

Shown in FIG. 2*b* is alternative embodiment to the embodiment illustrated in FIG. 2*a*. The bag conversion process shown in FIG. 2*b* is similar to the processes described for FIG. 2*a* except for the length and relative location of each incrementally stretched section. The incremental stretching operation 220 of FIG. 2*b* is configured to stretch a greater length of collapsed tube 110 relative to the incrementally stretched section 116 of FIG. 2*a*, resulting in incrementally stretched sections 216 and un-stretched sections 218. After being incrementally stretched, bag converter 240 can form sets of closely spaced parallel seals 242 centered about a height of an un-stretched section 218 and perforation lines 244 centered within each set of closely spaced seals 242.

Further shown in FIG. 2*b* is wave-cutter 250 configured to place each wave-cut 252 centered about a height of another un-stretched section 218 resulting in individual bags 254 with a top open edge defined by wave-cut 252 and bottom seal 244. An incrementally stretched section 216 is located in a central body and a first un-stretched section is located below the stretched body and a second un-stretched section is located above the stretched body. Other details of the bag conversion processes of FIG. 2*b* are not explained further since it is duplicative with the processes as explained above for FIG. 2*a*.

As one skilled in the may ascertain, the length of each incrementally stretched section 216 is greater than the incrementally stretched section 116 of FIG. 2*a*. For instance, rather than a stretched length of 15 inches as described for FIG. 2*a*, the incremental stretching process 220 may be configured to stretch the collapsed tube 210 approximately 30 inches when configured for manufacturing bags with a total height of 50 inches. This height could vary, however, depending upon the size of bag being manufactured and the desired length of the stretched body of the bag. The stretched body of the bag may centered between the bottom and top of the bag or it may be offset to a degree towards the bottom or top of the bag. For similar sized bags as described for FIG. 2*a*, the other dimensions discussed above would remain unchanged. However, the size of the rollers necessary for the incremental stretching operation discussed above would change proportionally to accomplish the increased length of the incrementally stretched section.

FIGS. 5 and 6 show in detail the structure of the trash bags 154 that may be formed from the above-described processes of FIGS. 1, 2, and 3*a*-4*b*. FIG. 5 shows that once adjacent perforation lines 144 are separated, a matching pair of interconnected trash bags 154 are defined. A boundary of each trash bag is defined by one of the wave-cuts 152. An incrementally stretched section 116 is shown located on the two adjoining bags 154. Further shown is first edge 112 and second edge 114 of the collapsed tube 110 defining two opposing sides of the two adjoining bags 154. Two opposing perforation lines 144 are shown defining a bottom of each adjoining bag 154. Once the perforated wave-cut 152 is separated, two separate trash bags result. One of the resultant trash bags 154*a* is shown in FIG. 6.

As shown in FIG. 6, each wave-cut trash bag 154*a* can comprise a front panel and a rear panel formed from opposing sides of the collapsed tube 110. The trash bag 154*a* can have a first side edge 112*b* defined by the first edge 112 of the collapse tube 110 and a second side edge 114*b* defined by the second edge 114 of the collapsed tube 110. The trash bag 154 can further have a bottom seal 142*a* defined by one seal of the closely spaced sets of seals 142. A bag bottom 144*a* can be defined by one of the perforation lines 144. The bag top 152*a* can be defined by one of the wave-cuts 152. The bag top 152*a* can have a wave-cut profile. The bag top 152*a* can be defined on both the front panel and back panel of the bag 154*a* and the bag top 152*a* can define a bag opening.

As shown in FIGS. 2, 5 and 6, an incrementally stretched portion 158 of the trash bag 154*a* can be comprised of an incrementally stretched section 116 of the collapsed tube 110. The incrementally stretched portion 158 can be a fractional length of one of the incrementally stretched sections 116. Within the incrementally stretched portion 158, a plurality of lobes 156 can be defined. The plurality of lobes 156 may also be referred to as tie-flaps. A wave-cut profile height H can be defined as a vertical distance from a top of the wave-cut profile to a bottom of the wave-cut profile, the wave-cut profile height H equal to an peak-to-peak amplitude of the wave shape of the wave-cut profile. The incrementally stretched portion 158 can extend from the bag top 152a to at least the bottom of the wave-cut profile. However, at least in one embodiment, the incrementally stretched portion 158 can extend below the bottom of the wave-cut profile up to one-half the wave-cut profile height H. In an alternative embodiment, the incrementally stretched portion 158 can extend below the bottom of the wave-cut profile at least a distance equal to the wave-cut profile height H. The incrementally stretched portion 158 can define a plurality of ribs extending from the first side edge 112b to the second side edge 114b of the bag 154a. The plurality of ribs can generally be parallel to each other and transverse to both the first side edge 112b and second side edge 114b.

In one particular example of the wave-cut trash bag 154a, a height of the bag from the bag bottom 144a to the upper extent of the bag top 152a may be 50 inches. A width of the bag from the first side edge 112b to the second side edge 114b may be approximately 33 inches. The wave-cut profile height H may be 5 inches with the incrementally stretched portion 158 extending 2.5 inches below the bottom of the wave-cut profile. Thus, the incrementally stretched portion 158 may have a height of approximately 7.5 inches, resulting in the remaining 42.5 inches of bag height un-stretched. The incrementally stretched portion 158 may be stretched approximately 15%. Thus, if the film of the collapsed tube is formed with a thickness of 3 mil, the incrementally stretched portion 158 may have an average thickness of approximately 2.5 mil with the remaining portions of the bag having a thickness of 3 mil.

Figure 7:
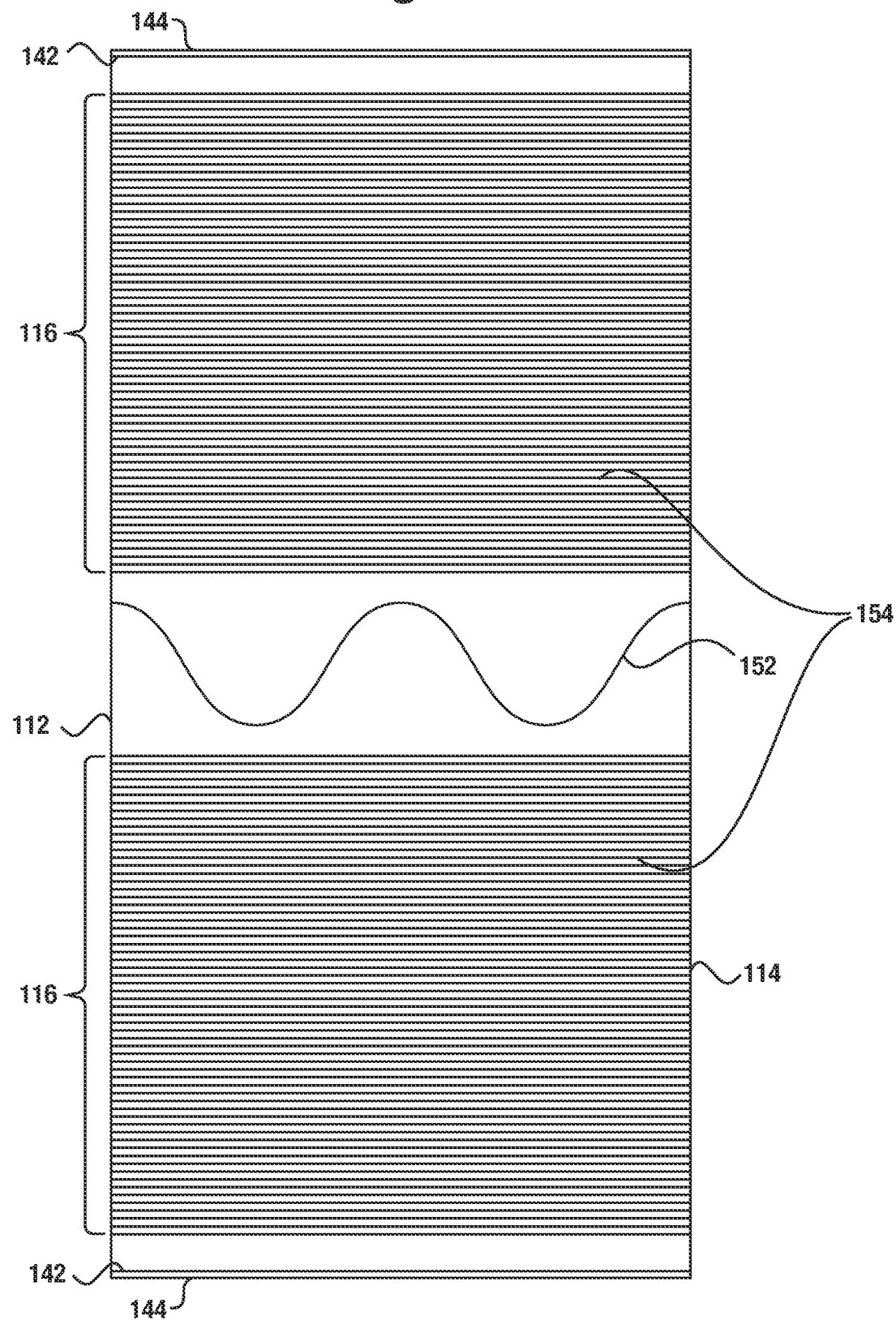
FIG. 7 depicts a front view of a sixth embodiment of the present invention.
Figure 8:
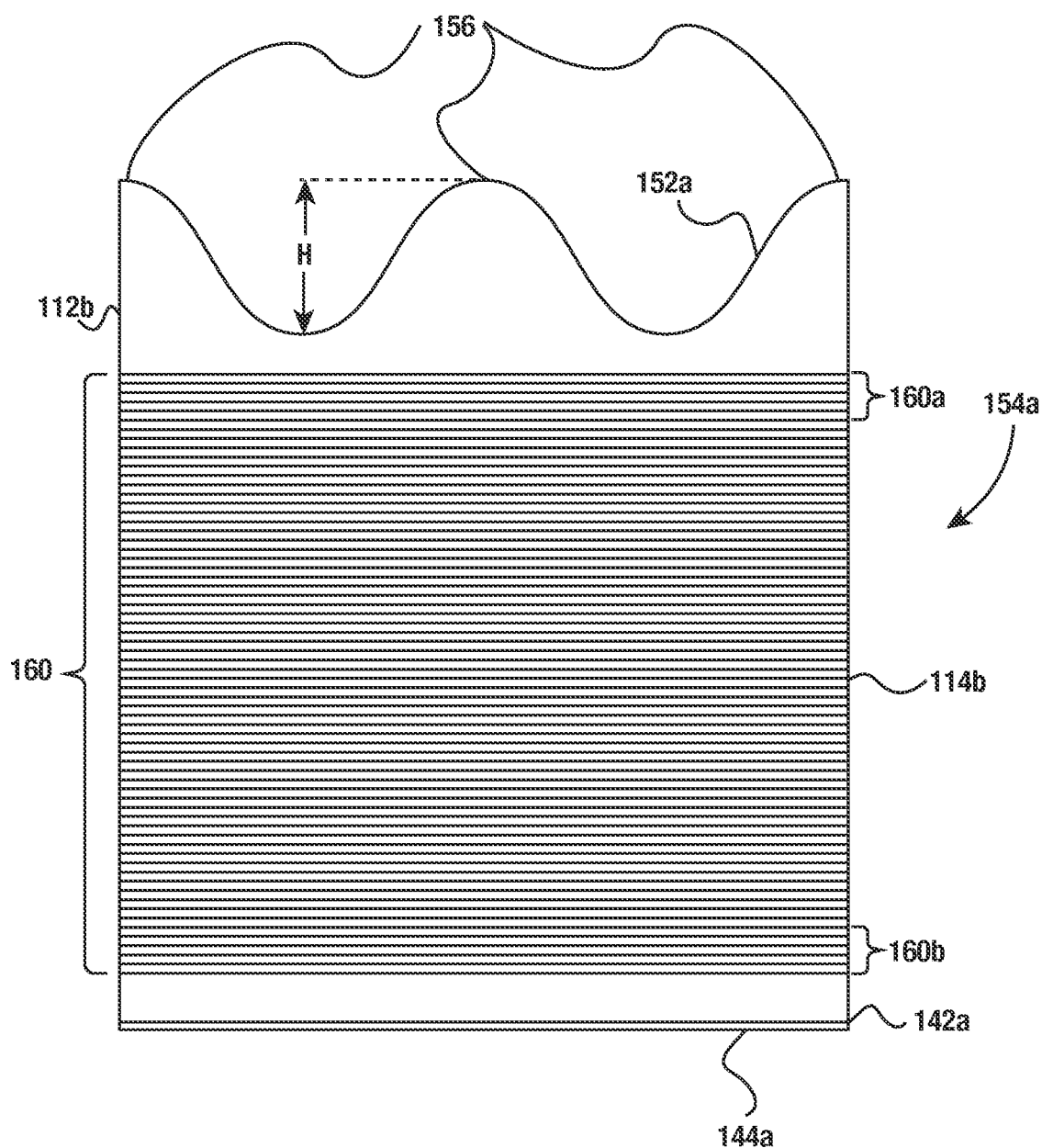
FIG. 8 depicts another front view of the sixth embodiment of the present invention.

Shown in FIGS. 7 and 8 is an alternative embodiment of the invention formed by the processes detailed by FIG. 2b as described above. Rather than each incrementally stretched section 116 aligned with one of the wave-cuts 152, each incrementally stretched section 116 can be offset from each wave-cut 152, as explained for FIG. 2b above. In this embodiment, each incrementally stretched section 116 is between adjacent perforation lines 140 and wave-cuts 152 so that a bag body 160 of each resultant bag 154 is incrementally stretched. The bag body 160 can be located between the lower extent of the bag top 152a and the bag bottom 144a.

Further shown in FIG. 8 are incrementally stretched transition zones 160a and 160b. It has been determined that when a polymeric web undergoes an incremental stretching operation as discussed above, the film of the web undergoes a transition from un-stretched film to fully incrementally stretched film. This transition is represented by the transitions zones 160a and 160b shown in FIG. 8. The structure of these transition zones is further detailed below in the discussion of FIG. 11.

In one particular example of the embodiment shown in FIGS. 7 and 8, the intermeshing rollers 122a, 122b can engage the collapsed tube 110 approximately 2.5 inches away from each side of each perforation line 142. Each incrementally stretched section 116 can be approximately 40 inches long, which results in a length of approximately 7.5 inches of un-stretched film from the upper extent of the bag top 152a to a top of the incrementally stretched bag body 160 for a bag having a total length of 50 inches. The bag body 160 can be stretched approximately 17 percent so that an initial film thickness of 3 mil is stretched to approximately 2.5 mil within the bag body 160. This embodiment allows less film, and hence less polymeric material, to be used than an otherwise similar un-stretched bag.

It is foreseeable, however, that the bag may disclosed in FIGS. 7 and 8 be shorter in length, such as 33 inches in length, since it is contemplated that bag 154a with an incrementally stretched body would be desirable for thinner wave-cut bags between 1-2 mils than the heavier 3 mil thick bags. Nonetheless, for bags in shorter lengths, such as 33 inches, it is contemplated that the other above discussed dimensions would be proportional to the dimensions discussed above for a bag having a length of 50 inches. It is further contemplated that a desirable thickness of bag 154a, as illustrated by FIG. 8, with a length of 33 inches may be approximately 1.3 mils. In at least one embodiment, it may be desirable to stretch central body of such a bag approximately 20% that results in the gauge by weight of the bag body being approximately one mils.

The embodiment shown in FIGS. 7 and 8 may also be implemented on a wave-cut trash bag having typical dimensions of a kitchen trash bag with. The bag body 160 can be stretched approximately 16 percent so that an initial film thickness of 0.7 mil is stretched to approximately 0.6 mil within the bag body 160.

Figure 9:
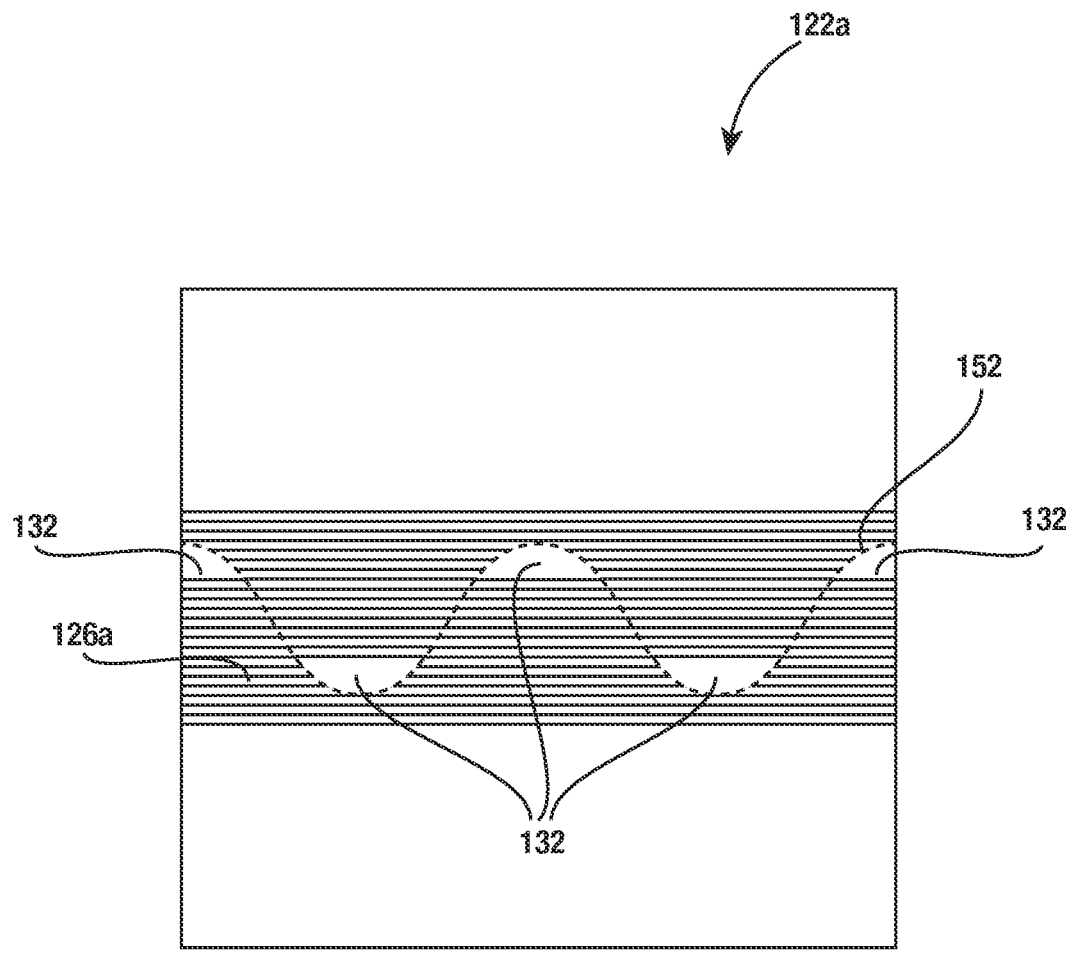
FIG. 9 depicts a top planar view of an intermeshing roller of a seventh embodiment of the present invention.

FIG. 9 illustrates yet another embodiment of the incremental stretching operation. Shown in FIG. 9 is a top planar view of an alternate embodiment of the outer surface of upper intermeshing roller 122a. The closely spaced parallel lines of FIG. 9 represent edges of each protruding ridge 126a. Although not to the same extend as previous illustrations, the spacing between adjacent ridges is exaggerated for ease of illustration. For reference, shown in dashed lines is the outline of the intended corresponding placement of a wave-cut 152. Within the plurality of protruding ridges 126a is shown a plurality of ridge voids 132. Each ridge void 132 is a location from which a length of protruding ridges has been removed from the intermeshing roller 122a. Each ridge void 132 defines a location where the intermeshing roller 122a will fail to stretch the collapsed tube 110 within each incrementally stretched section 116. The ridge voids 132 are located about the intermeshing roller 122a such that an upper region of each lobe 156 of each bag 154 is left un-stretched.

Figure 10:
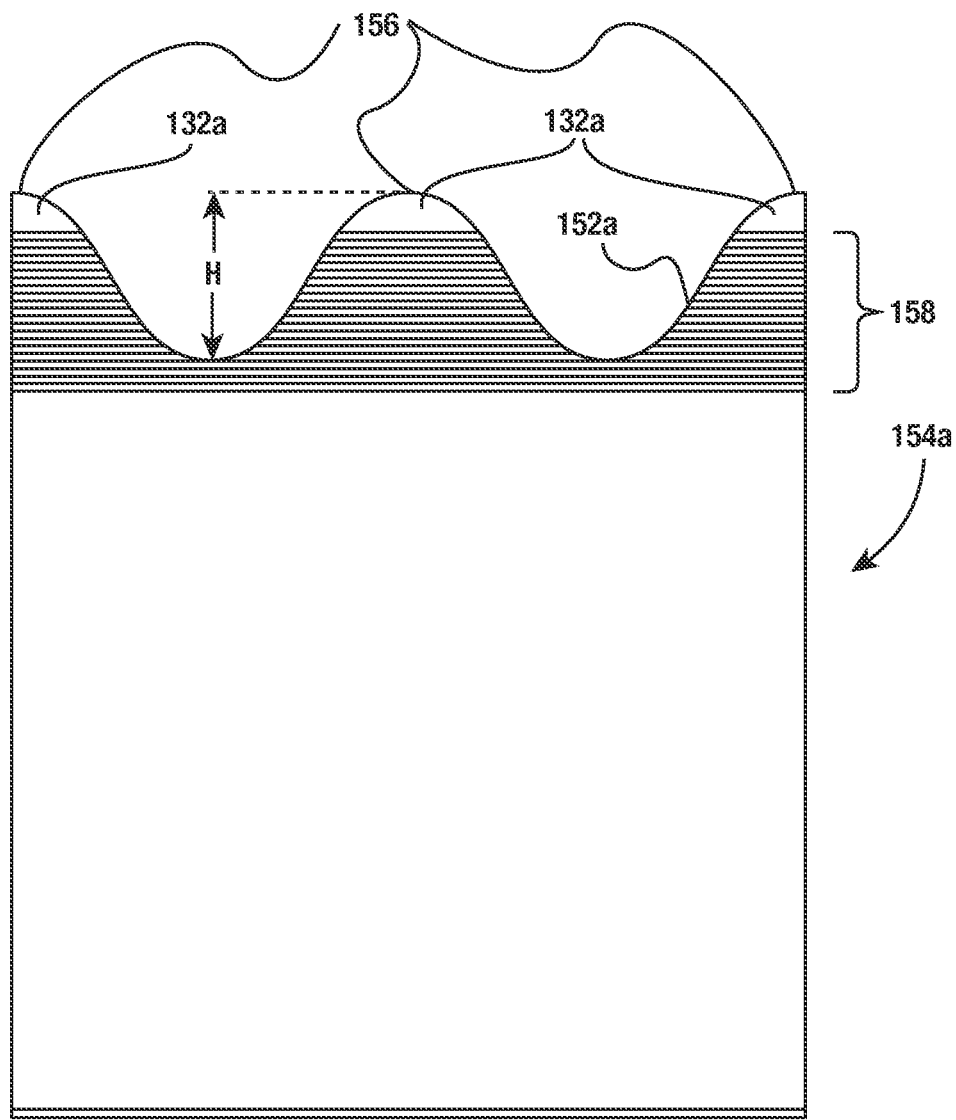
FIG. 10 depicts a front view of a trash bag of the seventh embodiment of the present invention.

FIG. 10 illustrates the structure of bag 154a formed by the alternate embodiment of the incremental stretching operation as illustrated by FIG. 9. As a result of the plurality of ridge voids 132, defined in an upper region of each lobe 156 is an un-stretched tip 132a that is devoid of any ribs that otherwise would have been formed by the incremental stretching operation. As shown in FIG. 10, a plurality of un-stretched tips 132 is defined on the bag 154. In a likewise manner, the incrementally stretched portion 158 of the bag does not extend to the upper extent of the bag top 152a. The remaining features of bag 154a remain unchanged from the embodiment illustrated in FIGS. 5 and 6. The un-stretched tips 132a may further improve the ease of tying the wave-cut trash bag versus the previously described embodiments.

Figure 11:
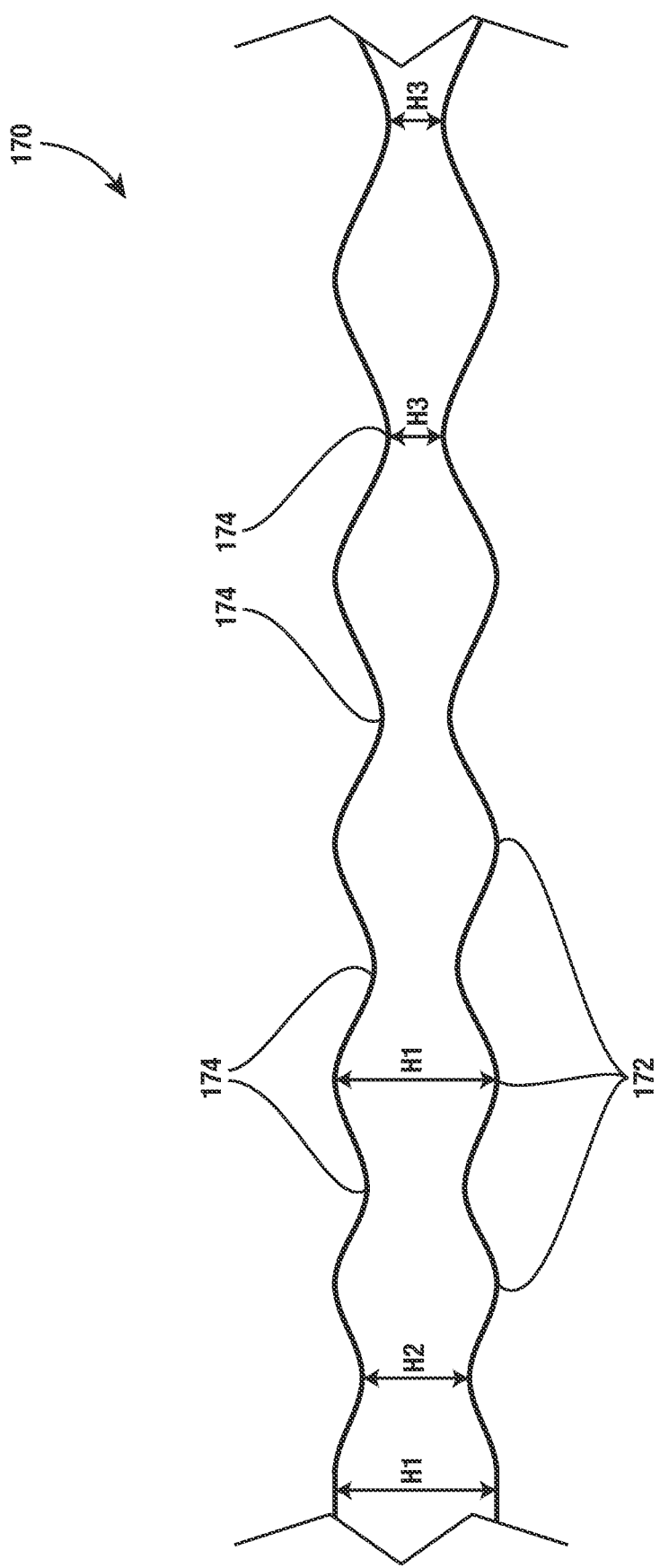
FIG. 11 depicts a side view of the gradual transition from an un-ribbed to a ribbed polymeric film due to an incremental stretching operation.

Shown in FIG. 11 is a side view of a partial length of film, with the thickness of the film exaggerated for clarity, subjected to an intermittent incremental stretching process as discussed above. Prior to entering an incremental stretching operation, such as operation 120 shown in FIG. 2a, the height, or thickness of the web 170, e.g. collapsed tube 110, is initially a first height H1 as shown in FIG. 11. The first height H1 is approximately equivalent to the gauge of the web. The incremental stretching operation forms thick ribs 172 and thin ribs 174 into the web 170. When the stretching operation initially engages the web 170, an initial height of the cross section of the web is a second height 112, a first transition height, since the stretching operation requires a certain amount of web length to fully engage the web 170. Multiple additional thin ribs of decreasing transition height (not shown) can be formed as the incremental stretching operation further engages the web 170. Once the stretching operation reaches a steady state operation, the height of each thin rib 174 decreases to a constant third height H3 that is maintained until the incremental stretching operation begins to disengage the web 170. The length of the web encompassing the thin ribs having heights between H1 and 113 can be defined as a first transition zone.

Although not shown in FIG. 11, when the incremental stretching operation begins to disengage the web 170, the transition reverses with a certain amount of thin ribs 174 having varying increasing heights, transitioning from the third height 113 until reaching the first height H1 once the incremental stretching operation fully disengages web 170. The length of web that encompasses the thin ribs with increasing heights between H3 and H1 can be defined as a second transition zone. This cycle of transition zones repeats when the incremental stretching operation is engaged once again for the next section of incrementally stretched film.

Shown in FIGS. 12-16 is a further embodiment of the present invention. Rather than incrementally stretching the bags, the process of FIGS. 12-16 intermittently embosses a pattern onto the collapsed tube 110. The embossed pattern allows the collapsed tube 110 to expand in the cross-direction to absorb shock in the cross-direction. Certain features of collapsed tube 110 remain unchanged from the previously discussed embodiment. These features share the same reference numbers and the disclosure above may be referenced for explanation of these shared features.

The embossing pattern utilized on the collapsed tube as shown in FIGS. 12-16 allows bags manufactured from the disclosed process to expand in the cross-direction, in the width direction of the bags, from a first side edge to a second side edge of the bag, to increase the capacity of the bags when filled with debris. The embossing pattern further prevents the propagation of tears due to the tortious path defined by the embossed pattern since a straight line cannot pass through more than one embossed region without intersecting an adjacent embossed region.

Figure 12:
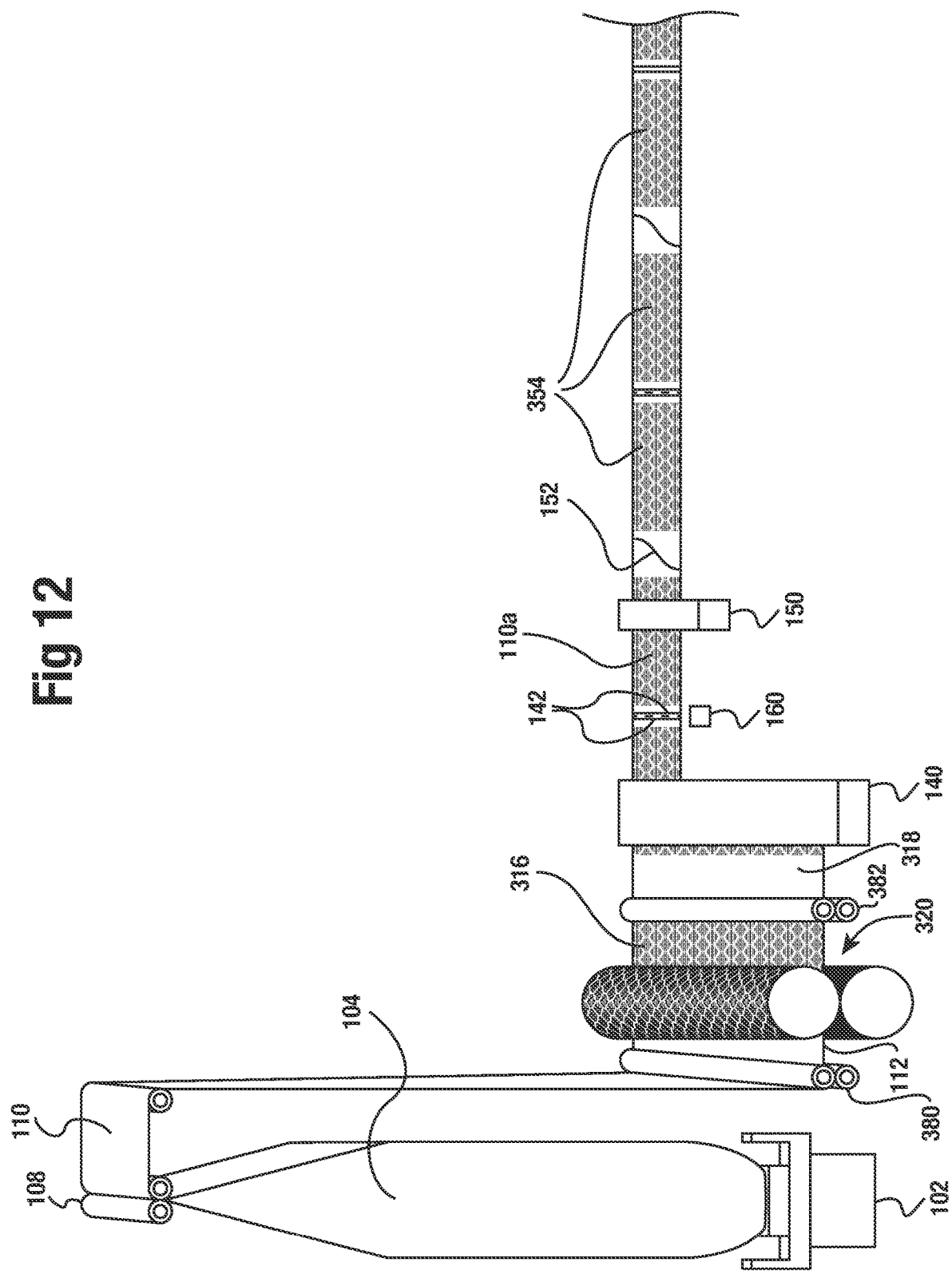
FIG. 12 depicts a perspective view of an eighth embodiment of the present invention.
Figure 13:
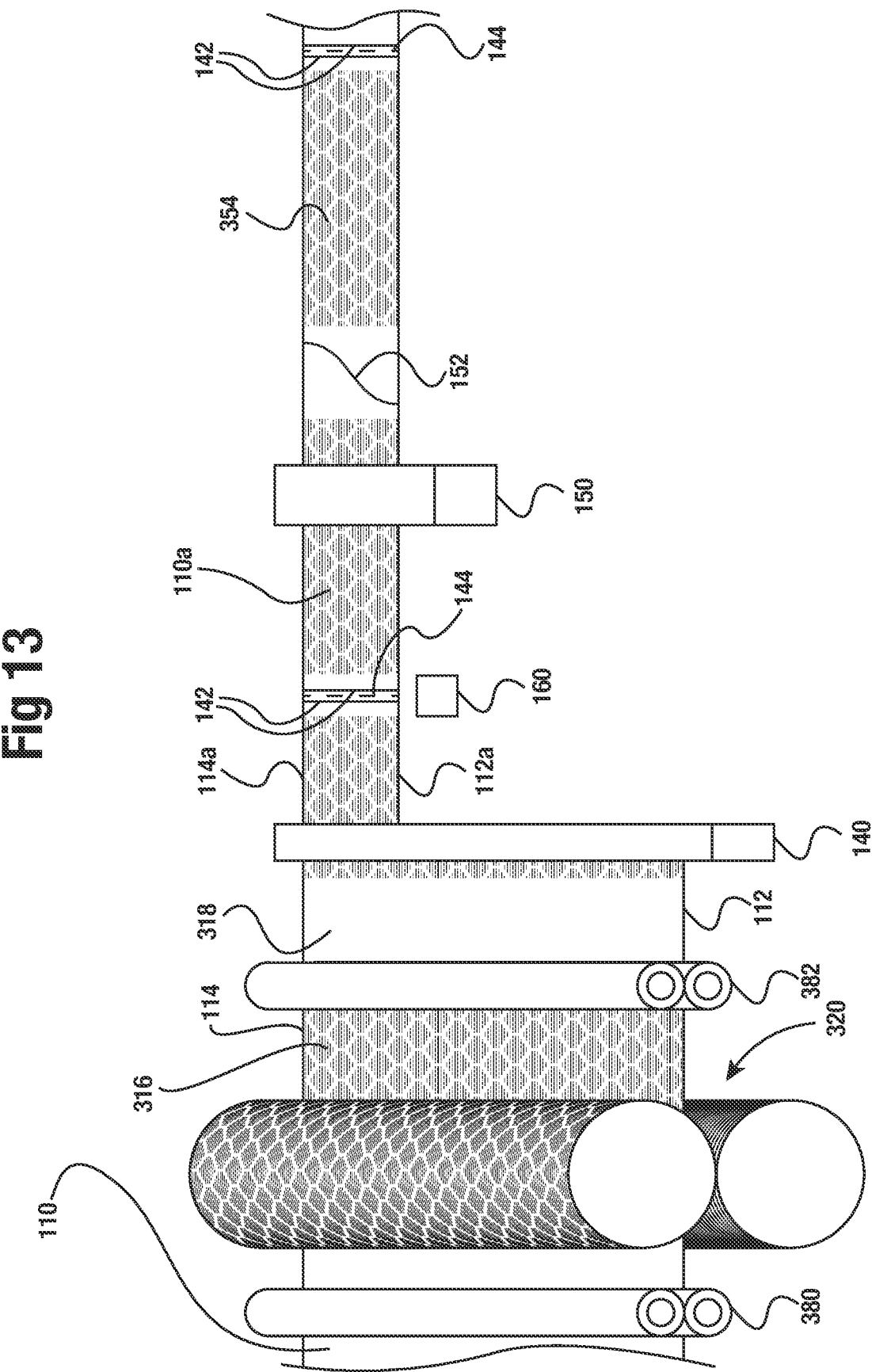
FIG. 13 depicts a partial perspective view of the eighth embodiment of the present invention.
Figure 14:
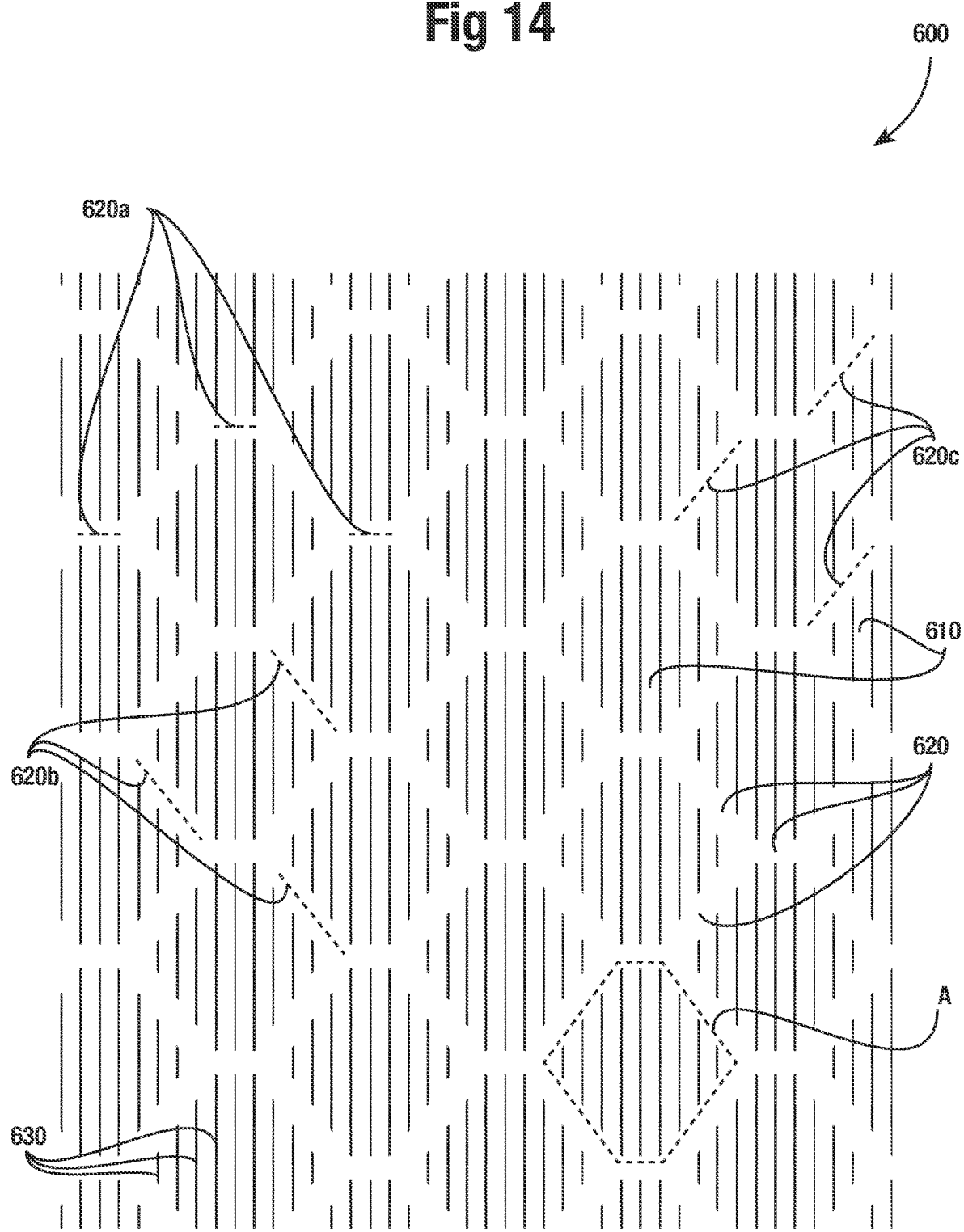
FIG. 14 depicts a top view of an embossing pattern of the eighth embodiment.

Shown in FIG. 14 is a detailed schematic view of a certain embodiment of the embossed pattern as illustrated generally in FIGS. 12 and 13. The embossed pattern 600 has a plurality of embossed regions 610, each embossed region 610 having a generally hexagonal shape with each embossed region 610 separated by a continuous unembossed arrangement 620. One of the hexagonal shapes is indicated by dashed lines A in FIG. 14. The dashed lines of A are shown for reference only and form no structure of the disclosed invention. Each embossed region 610 is shown as defined by nine parallel and adjacent linear embosses 630. The two opposing horizontally extending sides of each embossed region 610 is defined by three middle adjacent parallel linear embosses 630 with equal length; each horizontal side of the hexagon formed by adjacent ends of the three linear embosses 630. Each of the other four diagonal sides of the hexagon can be defined by an endpoint of an outer emboss of the three middle adjacent linear embosses 630 and adjacent end points of three other outer adjacent linear embosses 630. Each of the three other adjacent linear embosses 630 can decrease in length the same amount as the adjacent linear emboss 630.

The hexagonal shaped embossed regions 610 of FIG. 14 can be oriented such that opposing vertices of each hexagon are at a left and right side of each hexagon is illustrated in FIG. 14. Adjacent to the vertices can be two short opposing, linear embosses 630 at each end of each embossed region 610. These opposing vertices encourage each embossed region to fold-in when the linear embosses unfold in the horizontal direction. Hence, a film with the embossed pattern 600 of FIG. 14 expands in the horizontal direction but not in vertical direction. This expansion is much greater and at a much lower force than would be required to stretch the unembossed film.

With the embossed pattern applied to the collapsed tube 110 with the linear embosses 630 extending in the machine direction and the opposing vertices aligned in the cross-direction, the embossed pattern 600 as shown in FIGS. 12, 13, 15a, and 15b allows the polymeric film of the collapsed tube 110 to expand in the cross-direction of the collapsed tube 110. Due to the hexagonal shape of the embossed regions 610, the depicted embodiment of the embossed pattern 600 provides features to prevent tear propagation since a tear propagating in the cross direction will be interrupted by an embossed region 610.

FIG. 14 depicts the unembossed arrangement 620 having a plurality of first segments 620a, a plurality of second segments 620b, and a plurality of third segments 620c. Each embossed region 610 is bounded by two first segments 620a, two second segments 620b, and two third segments 620c. Each first segment 620a extends in a first direction that is generally horizontal. Each second segment 620b extends in a second direction that is oblique to the first direction. Each third segment 620c extends in a third direction that is oblique to both the first direction and the second direction. The first, second, and third directions are all distinct from each other. As shown in FIG. 14, each of the segments 620a, 620b, or 620c are interrupted by an adjacent embossed region 610, failing to extend past more than one embossed region 610.

As further shown in FIG. 14, the first segments 620a intersect both the second segments 620b and third segments 620c. Furthermore, a first segment 620a, a second segment 620b, and a third segment 620c all intersect each other adjacent to both the upper and lower vertices of each embossed region 610. In a particular embodiment of the embossed pattern 600, the angle formed by each intersection by a first segment 620a with a second segment 620b or third segment 620c can be approximately 54 degrees or the supplementary angle of 126 degrees. In the same embodiment, the angle formed by each intersection of a second segment 620b with a third segment 620c can be approximately 108 degrees.

The preferred actual size and spacing of the embossed pattern 600 is substantially exaggerated for ease of illustration in the figures. However, in one preferred embodiment, the spacing of the ridges can be about 20 ridges per inch about the circumference of the first roller 322a so that each embossed region 610 is about 0.45 0.5 inch in length.

Now returning to the bag formation process of FIGS. 12 and 13, the collapsed tube 110 can feed directly into embossing operation 320 once the film exits the nip rollers 108 of the extrusion operation 102, as previously discussed in regards to FIGS. 1 and 2a. Thus, the embossing can be performed as an in-line process, synchronously, with the blown film extrusion. As shown in the figures, the embossing operation 320 can be configured to only intermittently emboss the collapsed tube 110, leading to embossed partial lengths of the collapsed tube 110. These embossed partial lengths of the collapsed tube can define a plurality of embossed sections 316 and unembossed sections 318 in the collapsed tube 110 as shown in FIGS. 12 and 13.

Figure 15A:
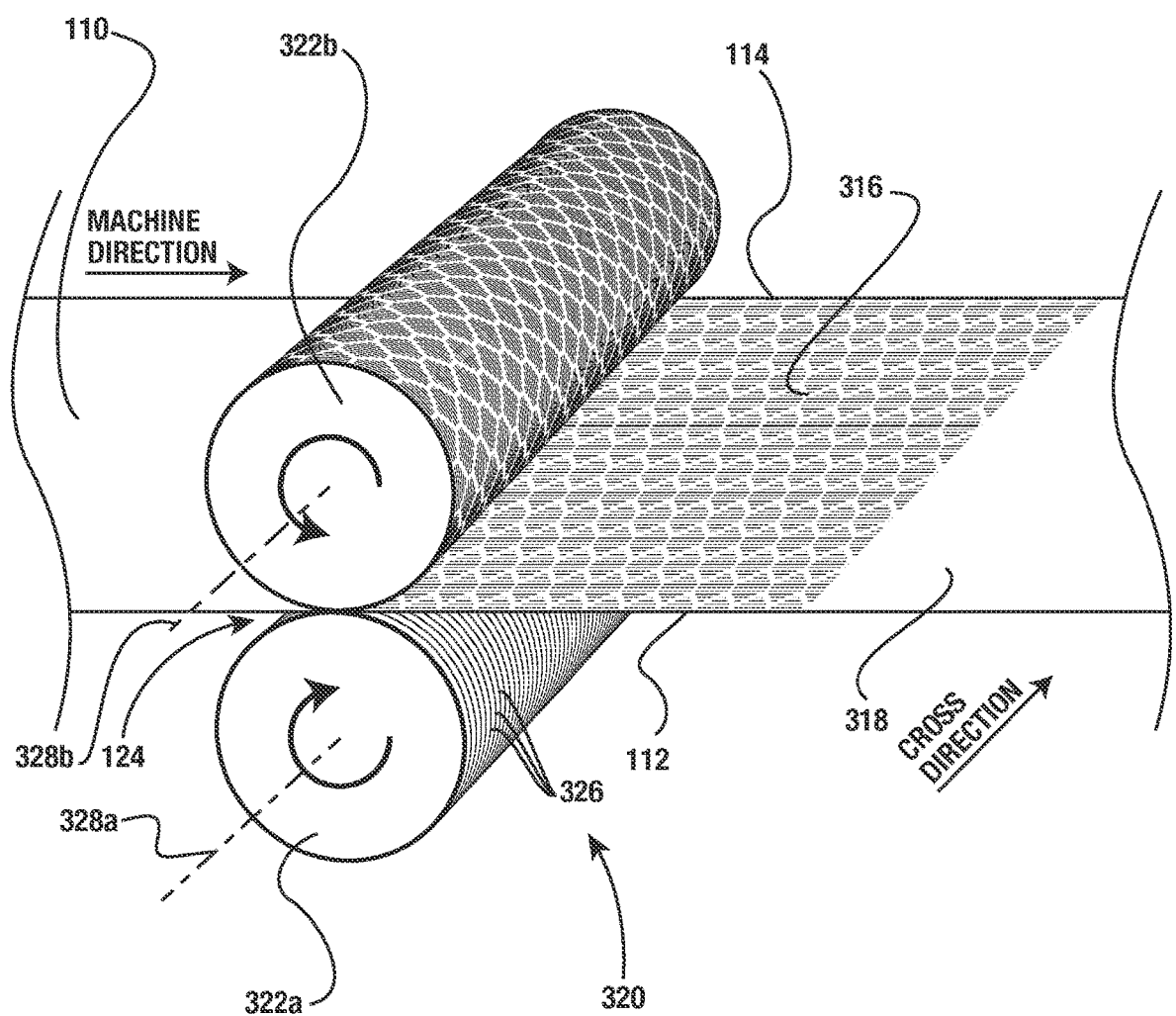
FIG. 15a depicts a perspective view of an incremental stretching operation of the eighth embodiment.
Figure 15B:
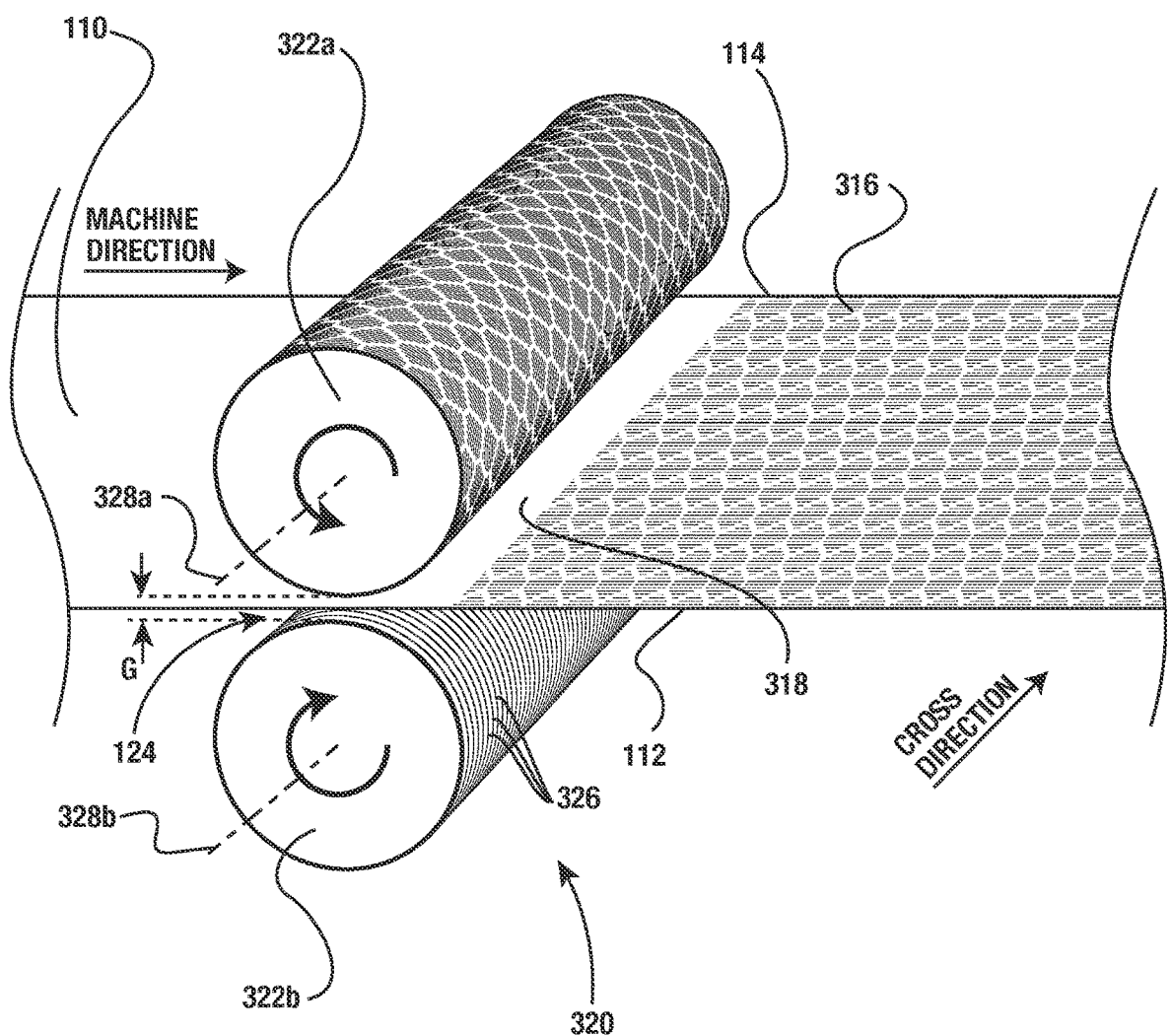
FIG. 15b depicts a second perspective view of the incremental stretching operation of the eighth embodiment.

As best shown in FIGS. 15a and 15b, the embossing operation 320 can include a pair of intermeshing rollers 322a, 322b. The diameter and length of the first intermeshing roller 322a and the second intermeshing roller 322b can be equal in at least certain embodiments. As further shown in FIG. 15a, the collapsed tube 110 can enter nip 124 defined by the pair of intermeshing rollers 322a, 322b. The rotational axes 328a, 328b of each roller 322a, 322b can be parallel to each other and transverse to the machine direction (MD) of the collapsed tube 110 as shown in the figures.

As illustrated by FIGS. 15a and 15b, the first intermeshing roller 322a can have a plurality of concentric ring-shaped ridges 326 and corresponding grooves extending about the circumference of the first roller 322a. The ridges 326 can be evenly dispersed about the length of the roller 322a. As explained further below, the second roller 322b can have an embossing pattern defined about its surface. The concentric ridges 326 of the first roller are constructed to intermesh with the embossing pattern of the second roller 322b. With the embossing pattern defined on the second roller 322b, as the collapsed tube 110 enters the nip of the intermeshing rollers 322a, 322b, the film of the collapsed tube 110 is embossed with the embossing pattern 600.

Figure 16:
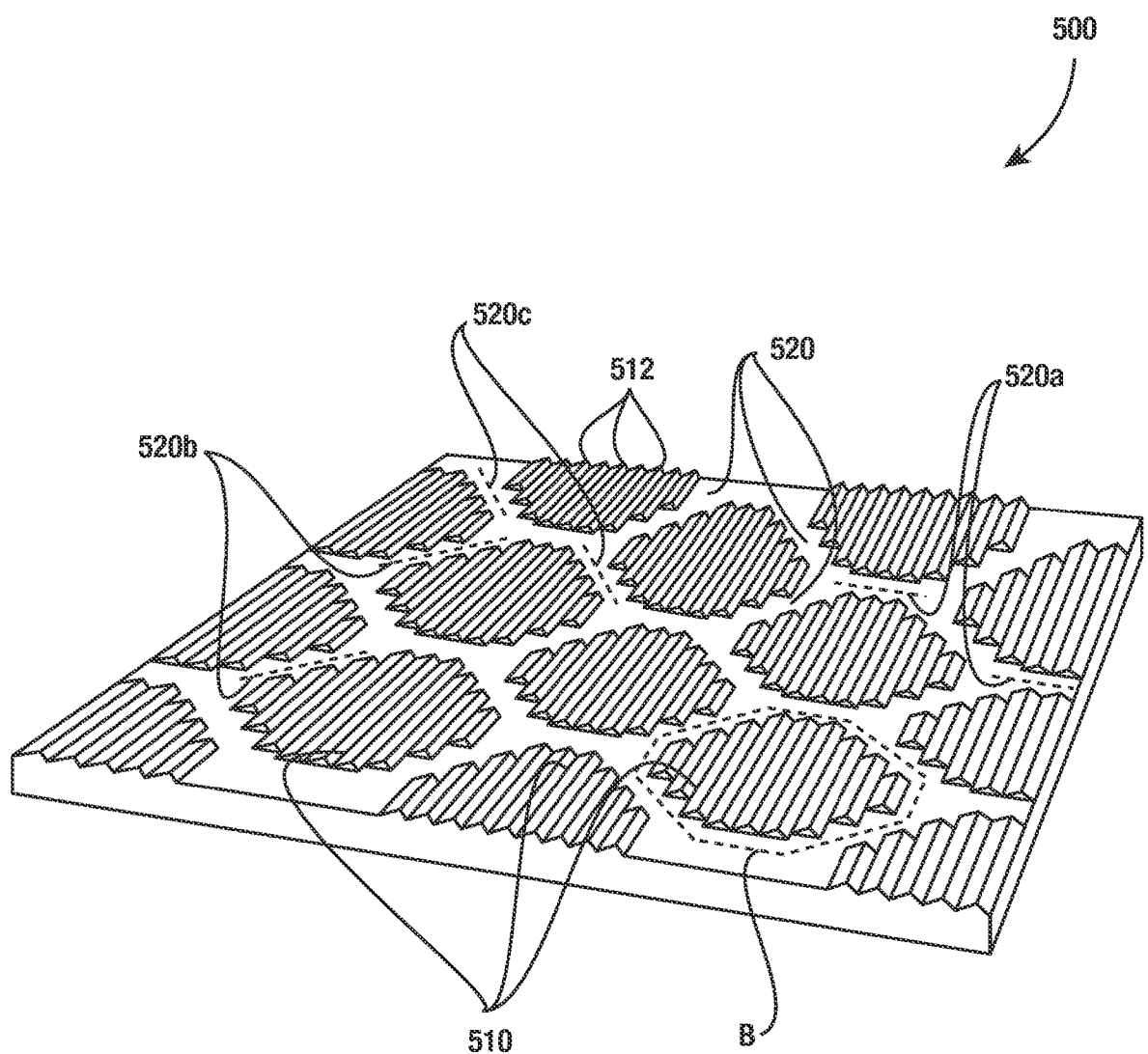
FIG. 16 depicts a perspective planar or flattened view of a section of an embossing roller of the eighth embodiment.

Shown in FIG. 16 is a detailed planar or flattened view of a section of the circumferential surface of the second intermeshing roller 322b. The orientation of the embossing pattern 500 is oriented approximately 90 degrees from its orientation as illustrated in FIGS. 15a and 15b for ease of illustration. As shown in FIG. 16, the embossing pattern 500 can have a plurality of embossment regions 510. The hexagonal shape of one of the embossment regions 510 is indicated by dashed lines B in FIG. 16, which is shown for reference only and forms no structure of the disclosed invention. As further shown in FIG. 16, each embossment region 510 can comprise a plurality of embossment ridges 512. Each of the embossment ridges can be parallel to each other and generally spaced evenly from each other.

As further shown in FIG. 16, each of the embossment regions can be bounded by a continuous embossment boundary 520. The embossment boundary can be substantially flat in relation to the embossment ridges 512 and devoid of any embossment ridges. The embossment boundary 520 can comprise first segments 520a, second segments 520b, and third segments 520c. As shown in FIG. 16, each of the three segments can extend in a different direction from each other. As should be apparent to one of ordinary skill in the art, the surface of the section illustrated in FIG. 16 necessarily follows the curvature of the surface of second roller 322b but is shown without the curvature (planar) for ease of illustration. The features of the embossing pattern 500 correspond with the emboss pattern 600 of FIG. 14. FIG. 16 is provided to illustrate the pattern on intermeshing roller 322b which results in forming the emboss pattern 600 on collapsed tube 110 due to the embossing operation 320.

Now returning to FIGS. 15a and 15b, the embossment ridges 512 (not shown) of the second intermeshing roller 322b, which follow the curvature of roller 322b, are offset from the concentric ridges 326 of the first roller 322a so that the ridges of the two rollers intermesh. As illustrated in FIG. 15a, once the collapsed tube 110 passes through the two intermeshed rollers 322a and 322b, the embossed pattern 600, as illustrated by FIG. 14, is formed into the polymeric film of the collapsed tube 110.

As best shown in FIGS. 12 and 13, the film of the collapsed tube 110 is embossed with the embossed pattern 600 intermittently, due to intermittent engagement of the intermeshing rollers 322a and 322b, as the collapsed tube 110 travels in the machine direction. This intermittent embossing results in a pattern of embossed and unembossed sections 316 and 318 on the collapsed tube 110. As illustrated in FIGS. 15a and 15b, the intermittent engagement of the collapsed tube 110 can be accomplished by the axes 328a and 328b of the pair of intermeshing rollers 322a, 322b moving away from each other a certain distance to create a gap G between the surface of the two rollers. This gap G allows the collapsed tube 110 to move past the embossing operation 320 without being embossed by the intermeshing rollers 322a, 322b. The gap G, as shown in FIG. 15b, must be large enough to allow the collapsed tube 110 to pass through the nip 124 without interference from the intermeshing rollers 322a, 322b.

Examining the FIGS. 15a and 15b in detail illustrates the intermittent engagement and disengagement of the intermeshing rollers 322a, 322b that define the embossed and unembossed sections 316 and 318 in the collapsed tube 110. FIG. 15a shows the two intermeshing rollers 322a, 322b intermeshed with each other, with no gap, engaging the film of the collapsed tube 110 and forming an embossed section 316 as the collapsed tube 110 travels in the machine direction. FIG. 15b shows the two intermeshing rollers 322a, 322b with the gap G between the rollers, not engaged, and hence no embossing taking place to define an unembossed section 318 on the film of the collapsed tube 110 as the tube continues to travel in the machine direction past the two intermeshing rollers 322a, 322b.

In an alternative embodiment, the above-described embossing operation 320 can be performed on a single layer web of polymeric film. For instance, the collapsed tube 110 may be slit along the first edge 112 so that the tube is open along the first edge 112. The collapsed tube may then be spread out so that the two opposing layers of the collapsed tube 110 lie in the same plane adjacent to each other. The single layer web may then be intermittently embossed as described above. Once the embossing is complete, the web may be folded so that the two layers of the collapsed tube 110 once again oppose each other. The two layers of film adjacent to the first edge 112 may then be sealed together so that the collapsed tube 110 may still be used to form wave-cut trash bags. Performing the embossing on one layer of film may prevent undesired binding of the two layers of film.

In another alternative embodiment, rather than the embossing operation 320 performed in-line and synchronously, as described above, with the blown film extrusion 102, the embossing 320 can be performed off-line from the blown film extrusion. For instance, once the polymeric bubble 104 is collapsed by the nip rollers 108, the collapsed tube 110 can be rolled onto a master roll. The master roll can then be placed at a lead end of the embossing operation 110 and the collapsed tube can be unrolled from the master roll. The collapsed tube 110 can then be fed into the embossing operation 320.

Returning now to FIGS. 12 and 13, it may be desirable to provide nip rollers on both sides of the embossing operation 320 to control tension in the collapsed tube as it enters and exits the intermeshing rollers 322a and 322b of the embossing operation 320. FIGS. 12 and 13 shows a pair of pre-embossing rollers 380 controlling tension in the collapsed tube prior to the film's entry into the nip of the intermeshing rollers of the embossing operation 320, or upstream to the embossing operation 320. The figures further show a pair of post-embossing rollers 382 controlling tension in the collapsed tube 110 upon exiting the intermeshing rollers of the embossing operation 320, or downstream from the embossing operation 320. Both the pre and post embossing rollers 380 and 382 are typical nip rollers as known in the art. The rotational speed of the pre and post embossing rollers 380 and 382 may be controlled independently from each other and from the intermeshing rollers 322a and 322b so that the tension in the collapsed tube 110 may be adequately controlled to aid in the desired engagement of the intermeshing rollers 322a and 322b into the polymeric film of the collapsed tube 110.

Figure 17:
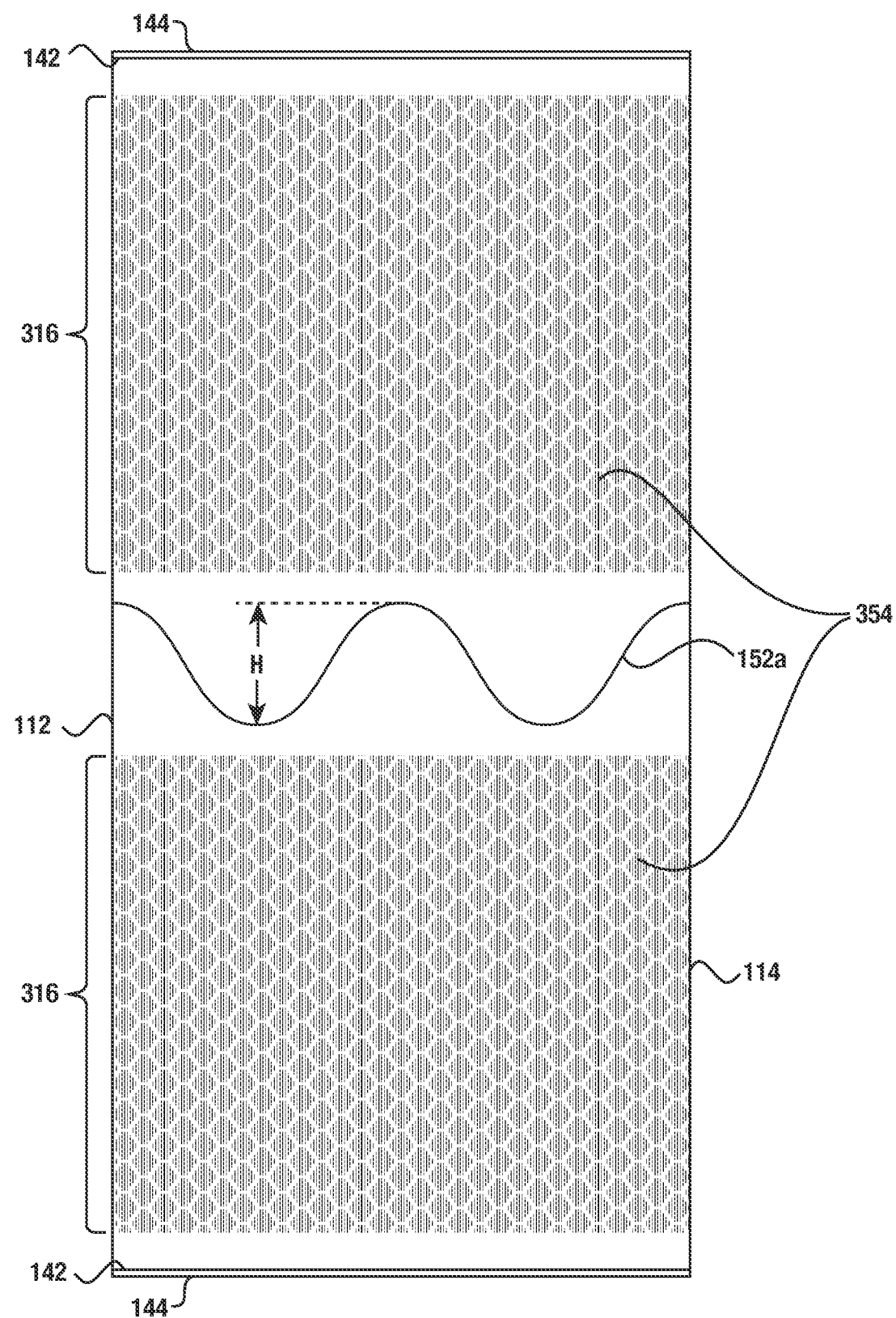
FIG. 17 depicts a front view of a ninth embodiment of the present invention.

As further shown by FIGS. 12 and 13, once the embossing is completed by embossing operation 320, the collapsed tube 110 can enter a bag converter 140. The bag converter 140 can form sets of closely spaced, parallel seals 142. The sets of closely spaced parallel seals 142 can extend transverse to the machine direction and across the entire width of the collapsed tube 110. As shown in FIGS. 17 and 18, one seal of each set 142 can define a bottom seal 142a for each bag 354a. As shown in FIG. 13, between each set of the closely spaced parallel seals 142, the bag converter 140 can form perforation lines 144. The perforation lines 144 can extend transversely to the machine direction, the cross direction, and across the entire width of the collapsed tube 110. Each perforation line 144 can define the bag bottom 144a (shown in FIG. 17) and separation point of adjoining bags 354.

Once again examining FIG. 13, once the sets of closely spaced parallel seals 142 and perforation lines 144 are formed, the bag converter 140 can fold the collapsed tube 110 one or more times, with each fold extending along the length of the collapsed tube 110 and parallel to the machine direction. In at least one particular embodiment, the collapsed tube 110 can be folded twice such that a width of the folded collapsed tube 110a is one-fourth the width of the un-folded collapsed tube 110. Once folded, a first folded edge 112a and second folded edge 114a can be defined in opposing edges of each bag 354.

Once the collapsed tube 110 is folded, it can proceed into a wave-cutter 150. The wave-cutter 150, which may also be referred to as a wave-cutting operation, creates wave-cuts 152. Wave-cuts 152 are wave-shaped perforations, extending across the width of the folded collapsed tube 110a. The wave-cuts 152 can perforate the folded collapsed tube 110a in the shape of a one-half sine wave extending across the width of the folded collapsed tube 110a. In one particular embodiment, the peak-to-peak amplitude of the sine wave can be approximately 5 inches but may vary considerably. Due to the collapsed tube 110a being folded twice when each wave-cut 152 is made, when un-folded each wave-cut can have, in general, a shape of two full sine waves extending across the width of the collapsed tube 110.

Once the collapsed tube is folded and the wave-cuts 152 are placed, the folded collapsed tube 110a may be separated at the perforation lines 144 and wave-cuts 152 into individual bags 354 with each bag having a height of approximately 50 inches in certain embodiments. Each bag 354 may then be overlapped with an adjoining bag and rolled into a roll of bags as is known in the art.

The location of the wave-cut 152 in relation to the perforation line 144 can be controlled by a timing operation 160. The timing operation 160 can detect the location of each perforation line 144. The timing operation 160 can rely upon a laser beam, infrared light, a spark generator, or another form of an electromagnetic signal to detect each perforation line 144. The detected location of each perforation line 144, along with the fixed position of the timing operation 160 and the collapsed tube 110 traveling at a steady state, can be used to time the embossing operation 320 and wave-cutting operation 150 so that each wave-cut 152 and embossed section 316 are placed at predetermined locations. The timing operation 160 may be a standalone operation or may be integrated into the bag converter 150. In an alternative embodiment, the timing of the embossing operation 320 may utilize the timing of the perforation operation itself rather than detection of the perforation line 144 to synchronize the engagement of the embossing operation 320 while the engagement of the wave-cutting operation may be based on an independent detection of the perforation line 144.

As shown in FIGS. 12 and 13, for each perforation line 144 placed in collapsed tube 110 two embossed sections 316 can be placed into the collapsed tube 110. Thus, the timing operation 160 may be configured to engage the embossing operation 320 two times for each perforation line 144 formed or detected in the collapsed tube 110.

Now turning to FIGS. 17 and 18, the structure of the trash bags 354 formed from the above-described processes of FIGS. 12-16 is shown. FIG. 17 illustrates that once adjacent perforation lines 144 are separated, a matching pair of interconnected trash bags 354 are defined. A boundary of each trash bag is defined by one of the wave-cuts 152. An embossed section 316 is shown located on each of the two adjoining bags 354. Further shown is first edge 112 and second edge 114 of the collapsed tube 110 defining two opposing sides of the two adjoining bags 354. Two opposing perforation lines 144 are shown defining a bottom of each adjoining bag 354. Once the perforated wave-cut 152 is separated, two separate trash bags result. One of the resultant trash bags 354a is shown in FIG. 18. As may be apparent to one having ordinary skill the art, that due to folding operation 140 as shown in FIGS. 12 and 13, the pair of bags 354 may be folded once wave-cut 152 is applied and formed in bags 354 but bags are shown unfolded for ease of illustration.

Returning now to FIG. 18, an individual bag 354a is shown. Each wave-cut trash bag 354a comprises a front panel and a rear panel, or first and second panels, formed from opposing sides of the collapsed tube 110. However, the front and rear panels are mirror images of each other and hence only a front panel is illustrated in FIG. 18. FIG. 18 shows trash bag 354a with a first side edge 112b defined by the first edge 112 of the collapse tube 110 and a second side edge 114b defined by the second edge 114 of the collapsed tube 110. The trash bag 354 is further shown with a bottom seal 142a defined by one seal of the closely spaced sets of seals 142. A bag bottom 144a or bottom edge is shown as defined by one of the perforation lines 144. The bag top 152a can be defined by one of the wave-cuts 152. The bag top 152a has a wave-cut profile due to the wave-cut 152. The bag top 152a is defined on both the front panel and back panel of the bag 354a with the bag top 152a defining a bag opening.

As illustrated by FIGS. 13, 17 and 18, an embossed section 358 of the trash bag 354a can be comprised of an entire embossed section 316 of the collapsed tube 110. A plurality of lobes 156 can be defined by the wave-cut profile 152a as shown in FIG. 18. The plurality of lobes 156 may also be referred to as tie-flaps. The wave-cut profile height H is shown as the vertical distance from a top of the wave-cut profile to a bottom of the wave-cut profile, the wave-cut profile height H equal to a peak-to-peak amplitude of the wave shape of the wave-cut profile. Furthermore, as best illustrated by FIG. 18, wave-shaped profile 152*a* comprises one or more crests 156*a*, or peaks of the wave shape, and troughs 156*b*, or valleys, of the wave shape of the wave-shaped profile.

Further shown in 18, embossed section 358 is offset from wave-cut 152*a*. Embossed section 358 is shown between perforation line 144*a* and wave-cut 152*a* so that the embossed section 358 is located in the body of bag 354*a*. Embossed section 358 is shown extending from the first side edge 112*b* to the second side edge 114*b* and from a lower embossment boundary 372 to an upper embossment boundary 370. Embossed section 358 is further shown below the troughs 156*b* of the wave-shaped profiled 156. The bag body can be located between the lower extent of the bag top 152*a* and the bag bottom 144*a*.

FIG. 18 further illustrates the upper embossment boundary 372 below the troughs 156*b* of the wave-shaped profile 152*a* and the lower embossment boundary 374 above the bottom seal 142*a*. Both upper and lower boundaries 370 and 372 are shown extending from the first side edge 112*b* to the second side edge 114*b* and generally parallel to the bottom seal 142*a* and hence generally perpendicular to the two side edges 112*b* and 114*b*.

Further shown in FIG. 18 above upper embossment boundary 370 and below lower embossment boundary 372 are upper and lower unembossed sections 362 and 364. Unembossed sections 362 and 364 are substantial flat and devoid of embossments since the embossing operation 320 has not been applied to these areas of the polymeric film of the collapsed tube 110. The unembossed sections 362 and 364 are generally flat in comparison to the embossed section 358 but can be expected to have a certain amount of surface roughness and unevenness due to typical surface variations of a polymeric film produced by a blown film extrusion process. Both unembossed sections 362 and 364 are shown extending from the first side 112*b* to the second side edge 114*b* of bag 354*a*. Upper unembossed section 364 is further shown extending from the upper embossment boundary 370 to the crests 156*b* of the wave-cut profile and lower unembossed section 362 is shown extending from the lower embossment boundary 372 to the bag bottom or bottom edge 144*a*.

Further shown in FIG. 18 are embossed transition zones 358*a* and 358*b*. It has been determined that when a polymeric film undergoes an embossing operation as discussed above, the film undergoes a gradual transition from an un-embossed section to a fully embossed section of film. This transition is represented by the transitions zones 358*a* and 358*b* shown in FIG. 18. Due to the gradual engagement of the intermeshing rollers 322*a* and 322*b* of the collapsed tube 110, the linear embosses adjacent to upper and lower embossment boundaries 370 and 372 taper with a decreasing height as the linear embosses extend from within the embossed section 358 towards the unembossed sections 362 and 364 above and below the embossed section 358.

In a particular example of the embodiment of FIG. 17 of the pair of bags 354, the perforation lines 144 can be 11⅜ inches away from each other. Each wave-cut 152 can also be separated from adjacent wave-cuts 152 by 11⅜ inches. The peak-to-peak amplitude of the wave-cut 152*a*, H, can be about 5 inches which is shared between the two bags. Hence, the height of an individual bag 354*a* can be about 54 inches. The upper embossment boundary 370 can be about 2 inches below the troughs 156*b* of the wave-cut 152*a* and the lower embossment boundary 372 can be about 2 inches above the bottom perforation or edge of bag 144*a*. These dimension results in the embossed section 358 having a height of about 45 inches. It is further contemplated that the embodiment shown in FIGS. 17 and 18 may also be implemented on a wave-cut trash bag having dimensions of a typical kitchen trash bag.

As previously noted, the specific embodiments depicted herein are not intended to limit the scope of the present invention. Indeed, it is contemplated that any number of different embodiments may be utilized without diverging from the spirit of the invention. Therefore, the appended claims are intended to more fully encompass the full scope of the present invention.

What is claimed is:

1. A bag formed from a collapsed tube of polymeric film, the bag comprising:

first and second panels joined along a first side edge, a second side edge, and a bottom edge, the first panel having a first top edge opposite the bottom edge and the second panel having a second top edge opposite the bottom edge, the first and second top edges defining an opening of the bag, both the first and second top edges having a wave-shaped profile, an embossment boundary below the wave-shaped profile, the embossment boundary extending between the first and second side edges, an embossed section below the embossment boundary comprising an embossed pattern, the embossed pattern arranged such that the bag expands from the first to the second side edge when filled, and the polymeric film above the embossment boundary not embossed.

2. The bag of claim 1 further comprising:

the embossed pattern comprising a plurality of embossed regions, each embossed region separated from adjacent embossed regions by an unembossed arrangement.

3. The bag of claim 1 further comprising:

the embossment boundary generally parallel to the bottom edge and extending from the first side edge to the second side edge.

4. The bag of claim 3 further comprising:

the embossed pattern not extending to the bottom edge.

5. The bag of claim 4 further comprising:

a bottom seal above the bottom edge sealing the first and second panels to each other.

6. A bag formed from a collapsed tube of polymeric film, the bag comprising:

first and second panels, the first and second panels extending from a first side edge to a second side edge, the first and second panels joined along the first side edge, the second side edge, and a bottom edge, the first and second panels each having a top edge opposite the bottom edge, the top edges defining an opening of the bag, each top edge having a wave-shaped profile, an upper embossment boundary below the wave-shaped profile, the upper embossment boundary extending from the first to the second side edge, a lower embossment boundary below the upper embossment boundary and above the bottom edge, the lower embossment boundary extending from the first to the second side edge, an embossed section extending between the upper and lower embossment boundaries, a first unembossed section extending from the upper embossment boundary to the wave-shaped profile and from the first side edge to the second side edge, the first unembossed section devoid of embossments, and a second unembossed section extending from the lower embossment boundary to the bottom edge and from the first side edge to the second side edge, the second unembossed section devoid of embossments.

7. The bag of claim 6 further comprising:

the embossed section comprising a plurality of embossed regions of embossments, each embossed region separated from adjacent embossed regions by an unembossed arrangement, and the first and second embossment boundaries generally parallel to the bottom edge.

8. The bag of claim 7 further comprising:

the unembossed arrangement comprising at least a plurality of first segments and a plurality of second segments, the plurality of first segments extending in a first direction and the plurality of second segments extending in a second direction, and the first and second directions distinct from each other.

9. The bag of claim 6 further comprising:

a machine direction of the collapsed tube extending in a direction generally perpendicular to the bottom edge.

10. The bag of claim 9 further comprising:

the bottom edge generally perpendicular to the first and second side edges.

11. The bag of claim 7 further comprising:

each embossment comprising a linear rib, each linear rib generally parallel to the first and second side edges.

12. The bag of claim 7 further comprising:

a first transition zone between the embossed section and the first unembossed section.

13. The bag of claim 12 further comprising:

the first transition zone comprising a plurality of linear embossments, the plurality of linear embossments having tapering heights with a height of the linear embossments decreasing as the linear embossments extend towards the first unembossed section.

14. The bag of claim 13 further comprising:

the embossed section formed from a pair of intermeshing rollers.

15. The bag of claim 6 further comprising:

a bottom seal above the bottom edge sealing the first and second panels to each other.

16. The bag of claim 15 further comprising:

the bottom seal proximate to and generally parallel to the bottom edge.

17. The bag of claim 6 further comprising:

the first unembossed section having a generally flat surface.

18. The bag of claim 17 further comprising:

the second unembossed section having a generally flat surface.

19. The bag of claim 13 further comprising:

a second transition zone between the embossed section and the second unembossed section.

20. The bag of claim 19 further comprising:

the second transition zone comprising a plurality of linear embossments, the plurality of linear embossments having tapering heights with a height of the linear embossments decreasing as the linear embossments extend towards the second unembossed section.

* * * * *